(12) United States Patent
Coutts et al.

(10) Patent No.: US 11,674,624 B2
(45) Date of Patent: *Jun. 13, 2023

(54) LOAD BEARING FLEXIBLE CONDUIT

(71) Applicant: HYDRASUN LIMITED, Aberdeen (GB)

(72) Inventors: Benjamin Douglas Coutts, Peterculter (GB); Jonathan Hill, Griffnock (GB)

(73) Assignee: HYDRASUN LIMITED, Aberdeen (GB)

( * ) Notice: Subject to any disclaimer, the term of this patent is extended or adjusted under 35 U.S.C. 154(b) by 552 days.

This patent is subject to a terminal disclaimer.

(21) Appl. No.: 16/707,950

(22) Filed: Dec. 9, 2019

(65) Prior Publication Data

US 2020/0116283 A1    Apr. 16, 2020

Related U.S. Application Data

(62) Division of application No. 14/851,955, filed on Sep. 11, 2015, now Pat. No. 10,520,121.

(30) Foreign Application Priority Data

Sep. 15, 2014    (GB) ...................................... 1416238

(51) Int. Cl.
  *F16L 33/01*    (2006.01)
  *F16L 33/22*    (2006.01)
  (Continued)

(52) U.S. Cl.
  CPC ............. *F16L 33/01* (2013.01); *F16L 11/085* (2013.01); *F16L 11/18* (2013.01); *F16L 11/20* (2013.01);
  (Continued)

(58) Field of Classification Search
  CPC .......... F16L 33/01; F16L 11/085; F16L 11/18; F16L 11/20; F16L 27/026; F16L 27/04; F16L 33/222; F16L 33/225
  See application file for complete search history.

(56) References Cited

U.S. PATENT DOCUMENTS 1,003,042 A    9/1911  Forth
1,821,274 A    9/1931  Plummer
(Continued)

FOREIGN PATENT DOCUMENTS

EP    1867906 A1    12/2007
EP    2489824 A2 *  8/2012  ............. E21B 17/00
(Continued)

OTHER PUBLICATIONS

United Kingdom Search Report for GB 1416238.2, dated Jul. 15, 2015, 5 pages.
(Continued)

*Primary Examiner* — Zachary T Dragicevich
*Assistant Examiner* — James A Linford
(74) *Attorney, Agent, or Firm* — Foley & Lardner LLP

(57) ABSTRACT

A load bearing flexible conduit system for use in a body of water and adapted for deployment from a reel located on a water going vessel into the body of water is disclosed. The system comprises a number of lengths of load bearing flexible conduit, each length of load bearing flexible conduit provided with an inner layer having a throughbore and a load bearing outer layer. A joint for connecting the lengths together has a body having a longitudinal axis and a throughbore and at least one flexible coupling to permit at least one of the ends of the respective first and second lengths of load bearing flexible conduit to move relative to the longitudinal axis of the joint.

10 Claims, 22 Drawing Sheets

(51) Int. Cl.
*F16L 11/08* (2006.01)
*F16L 27/04* (2006.01)
*F16L 11/18* (2006.01)
*F16L 11/20* (2006.01)
*F16L 27/02* (2006.01)

(52) U.S. Cl.
CPC ............ *F16L 27/026* (2013.01); *F16L 27/04* (2013.01); *F16L 33/222* (2013.01); *F16L 33/225* (2013.01)

(56) References Cited

U.S. PATENT DOCUMENTS

| | | | |
|---|---|---|---|
| 2,680,358 A | | 6/1954 | Zublin |
| 3,217,282 A | | 11/1965 | Chevalier et al. |
| 3,306,637 A | | 2/1967 | Press |
| 3,475,039 A | | 10/1969 | Ortloff |
| 5,791,695 A | | 8/1998 | Snider |
| 6,161,880 A | * | 12/2000 | Peppel ............ F16L 33/01 285/104 |
| 2003/0189337 A1 | | 10/2003 | Palmer |
| 2008/0284165 A1 | | 11/2008 | Chiang |
| 2009/0160184 A1 | | 6/2009 | Vo |
| 2011/0101686 A1 | | 5/2011 | Dalmolen et al. |

FOREIGN PATENT DOCUMENTS

| | | | | |
|---|---|---|---|---|
| FR | 3007494 A1 | | 12/2014 | |
| GB | 371121 B1 | | 4/1932 | |
| GB | 805911 A | * | 12/1958 | |
| GB | 2439147 A | * | 12/2007 | ............ F16L 33/01 |
| WO | WO-9725564 A1 | * | 7/1997 | ............ F16L 33/01 |
| WO | WO-2010067092 A1 | * | 6/2010 | ......... E21B 17/015 |
| WO | 2010111335 A1 | | 9/2010 | |
| WO | WO-2013005000 A2 | * | 1/2013 | ............ B23P 11/00 |
| WO | 2013182196 A1 | | 12/2013 | |

OTHER PUBLICATIONS

European Search Report and Written Opinion in corresponding Application No. EP15275203.6, dated Feb. 19, 2016, 9 pages.
Great Britain Search Report in corresponding Application No. GB1516238.1, dated Mar. 4, 2016, 2 pages.
European Examination Report for Application No. EP 15275203.6, dated Oct. 23, 2017, 4 pages.

* cited by examiner

Section C-C

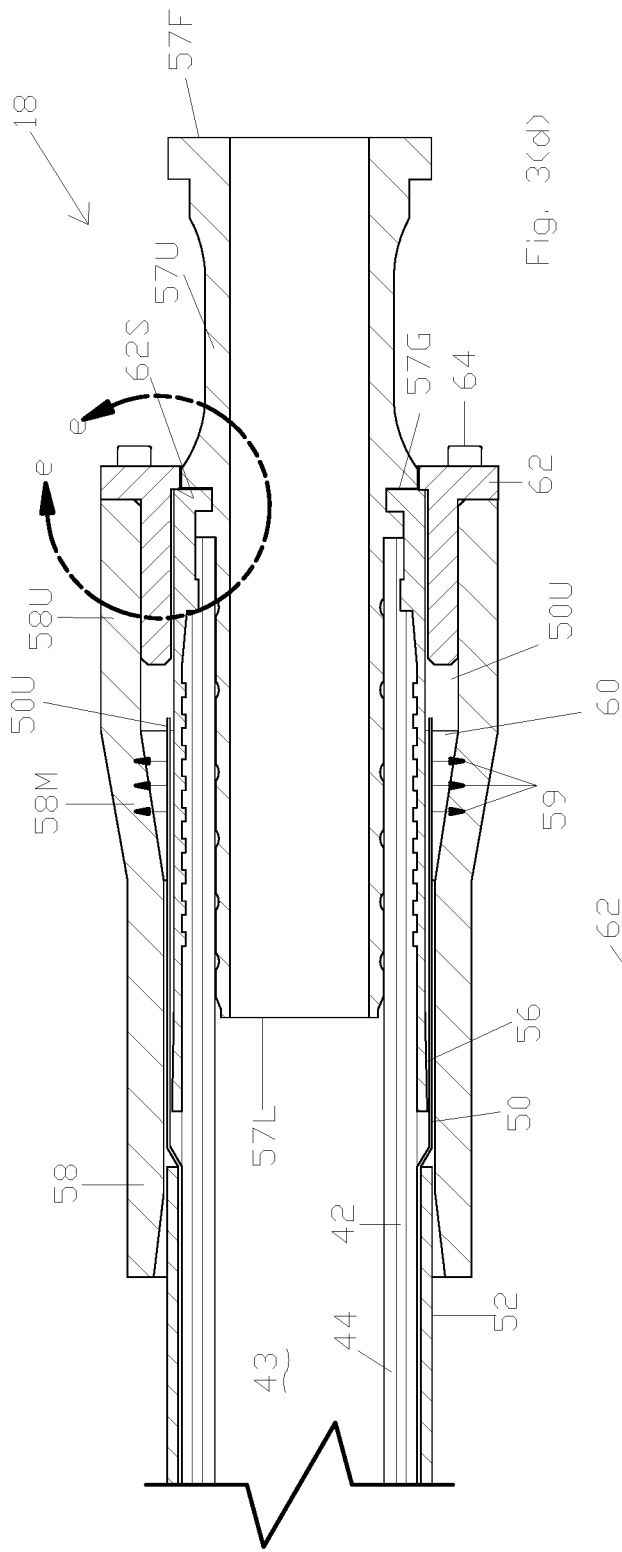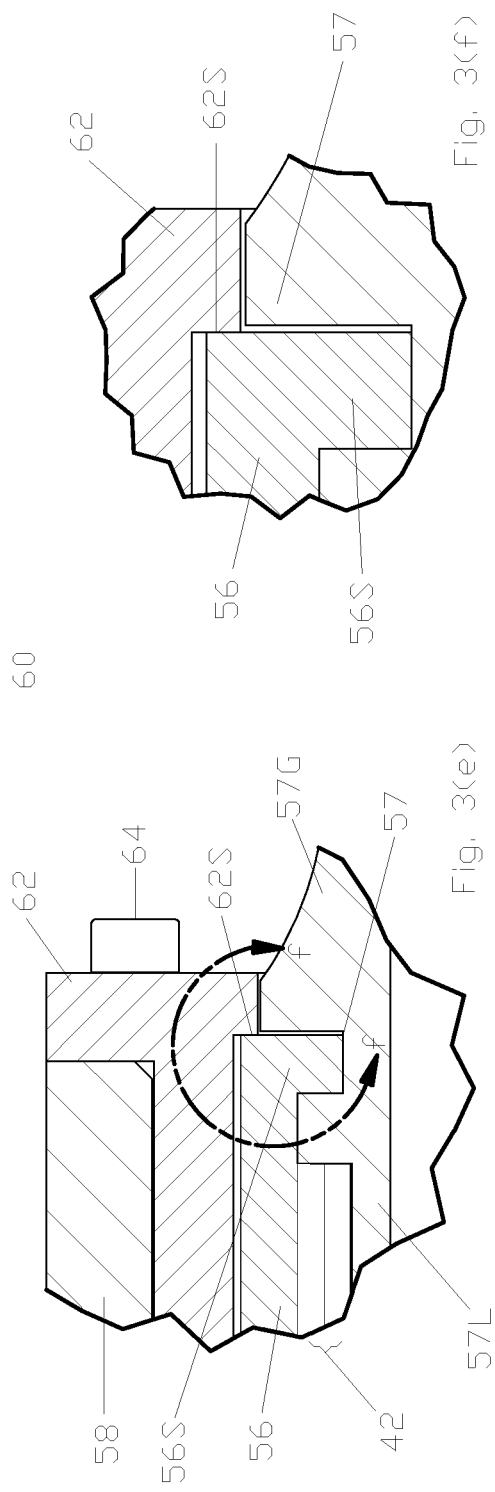

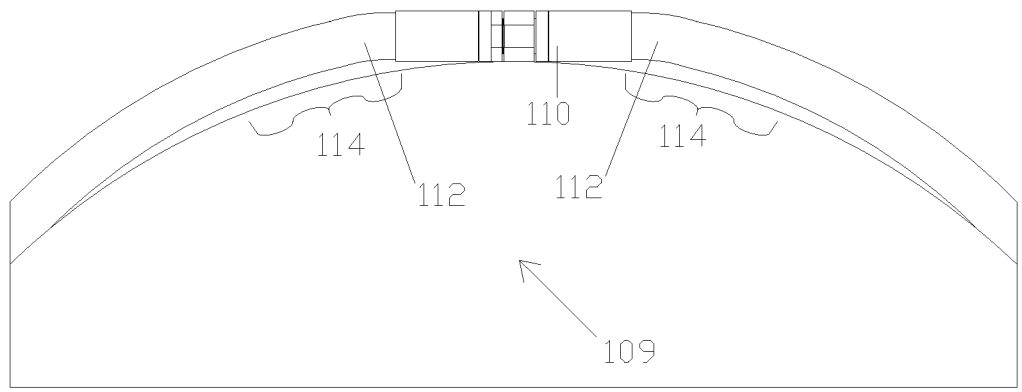
Fig. 6 - PRIOR ART

LOAD BEARING FLEXIBLE CONDUIT

This application is divisional application of U.S. patent application Ser. No. 14/851,955, filed Sep. 11, 2015, which claims priority under 35 U.S.C. § 119 to GB Application No. 1416238.2, filed Sep. 15, 2014, all of which are incorporated herein by reference in their entirety.

The present invention relates to apparatus for and a method of lowering a distribution manifold or similar clump weight used in subsea applications and/or delivering fluids between a first location and a second location through a body of water and more particularly between a vessel on the surface of the sea to a wellhead or other subsea structure located below the sea typically on the seabed in relatively close proximity to a hydrocarbon well. The flexible conduit therefore functions as the load bearing mechanism to lower the distribution manifold or clump weight to the seabed and also to transfer fluids from the surface to the seabed.

BACKGROUND TO THE INVENTION

Conventionally, it is known to use flexible conduits such as hoses to transport fluids such as wellbore reservoir stimulation fluids from a vessel on the sea surface to the wellhead located on the seabed, the flexible conduit thus providing a conduit for the said fluids through the seawater column. Conventionally, it is also known to use a steel cable to lower a distribution manifold or clump weight used in subsea applications to the seabed, and in order to provide strength/tension support to the flexible hose by securing the flexible hose to the said steel cable e.g. from a crane or reeler unit, the steel cable thus being used to lower the flexible hose from the vessel on the sea surface all the way down to the seabed, the steel cable therefore taking the weight of the flexible hose. This arrangement is used because conventional flexible hoses are simply not strong enough to be able to take and support their own weight, particularly given that the length of the flexible hose that is required may be many hundreds of metres or over one kilometre in length.

Alternatively, instead of using such conventional flexible hose, it is also known to use coiled tubing which is typically a metal pipe in the region of one to three inches in diameter and which may be coiled around a reel and which typically would not require to be strapped to a steel cable from a crane or reeler unit cable because it is typically capable of supporting its own weight when in seawater. However, coiled tubing suffers from the disadvantage that it requires specialist equipment and personnel on-board the vessel to deploy it and also it is relatively heavy when stored on the reel and therefore it is not as readily transportable, for instance on an airplane as a lighter weight flexible conduit reel. Furthermore, coiled tubing can typically only be used a certain number of times before it requires to be scrapped because the uncoiling and coiling of it off and onto the reel, in addition to flexing during operations, causes fatigue in the coiled tubing.

Such conventional flexible hose or coiled tubing is typically used to provide a conduit through which fluids such as well stimulation fluids or fluids to commission a pipeline located on or in the subsea surface or to transfer fluids for use in emergency well situations in order to e.g. inject chemical dispersant in the event of a loss of hydrocarbon containment. The fluids will typically be pumped into or injected into or in the vicinity of a wellhead which is located on the subsea surface or it may be pumped into other well equipment for maintenance or other purposes.

It is therefore desirable to be able to provide a relatively lightweight load bearing flexible conduit which does not require to be secured to a steel cable or the like. It is therefore an object of the present invention to overcome some or many of the disadvantages or at least mitigate the disadvantages of the prior art and provide a system with a number of technical and commercial advantages over the prior art systems.

SUMMARY OF THE INVENTION

According to a first aspect of the present invention there is provided a load bearing flexible conduit system for use in a body of water and adapted for deployment from a reel located on a water going vessel into the body of water, the system comprising:
- at least a first and a second length of load bearing flexible conduit, each length of load bearing flexible conduit provided with an inner layer having a throughbore and a load bearing outer layer; and
- a joint for connecting one end of the first length of load bearing flexible conduit to one end of the second length of load bearing flexible conduit, the joint comprising:
  - a body having a longitudinal axis;
  - a throughbore adapted for sealed fluid connection with the throughbore of the first and second lengths of load bearing flexible conduit; and
  - at least one flexible coupling to permit at least one of the said one ends of the respective first and second lengths of load bearing flexible conduit to move relative to the longitudinal axis of the joint;
  - wherein the at least a first and a second length of load bearing flexible conduit is sufficiently flexible such that it is capable of being stored, prior to use, on a reel and is further capable of being at least partially payed out from the reel into the body of water during use.

The system may comprise additional joints for connecting to the other end of the said first and second lengths and may comprise additional lengths of load bearing flexible conduit to form a longer system of a plurality of pairs of lengths of load bearing flexible conduit each connected by a said joint.

Preferably, each length of load bearing flexible conduit is provided with an inner layer having a throughbore for carrying fluids.

According to another aspect of the present invention there is provided a length of load bearing flexible conduit for use in a body of water and adapted for deployment from a reel located on a water going vessel into the body of water, the load bearing flexible conduit comprising an inner layer having a throughbore for carrying fluids and a load bearing outer layer and a further outer protective covering, wherein the outer protective covering does not cover the ends of the load bearing outer layer wherein the load bearing flexible conduit is sufficiently flexible such that it is capable of being stored, prior to use, on a reel and is further capable of being at least partially payed out from the reel into the body of water during use.

Preferably, the inner layer is substantially leak proof.

The length of load bearing flexible conduit is preferably adapted for connection to another length of load bearing flexible conduit also in accordance with the present invention. The length of load bearing flexible conduit may be connected to another length of load bearing flexible conduit by a flexible coupling wherein the flexible coupling permits coupled ends of the resulting pair of lengths of load bearing flexible conduit to move relative to a longitudinal axis of the flexible coupling such that the pair of lengths of load bearing flexible conduit are capable of being wound around a reel together. Alternatively, one length of load bearing flexible conduit is arranged to be wound around a reel and said one length of load bearing flexible conduit is capable of being connected to another length of load bearing flexible conduit (which typically has already been payed out into a body of water from the vessel) by a rigid coupling on the vessel, following which the pair of lengths of load bearing flexible conduit and the rigid coupling are lowered into the body of water.

According to another aspect of the present invention there is provided a joint for connecting one end of a first length of load bearing flexible conduit to one end of a second length of load bearing flexible conduit, wherein the joint and the at least first and second lengths of load bearing flexible conduit are for use in a body of water and are adapted for deployment from a reel located on a water going vessel into the body of water, the joint comprising:
  a body having a longitudinal axis;
  a throughbore adapted for sealed fluid connection with the throughbore of the first and second lengths of load bearing flexible conduit; and
  at least one flexible coupling to permit at least one of the said one ends of the respective first and second lengths of load bearing flexible conduit to move relative to the longitudinal axis of the joint;
  wherein the joint and the at least first and second lengths of load bearing flexible conduits are when connected sufficiently flexible such that they are capable of being stored, prior to use, on a reel and are further capable of being at least partially payed out from the reel into the body of water during use.

Preferably, the load bearing flexible conduit is capable of bearing the weight of itself and all the joints located below it and in addition is capable of bearing the weight of all the other load bearing flexible conduits located below it in the system and in addition is capable of bearing the weight of the fluid located in the throughbore of the joints and the load bearing flexible conduit and more preferably is additionally or further capable of supporting or bearing the load of a clump weight which may comprise equipment utilised in subsea operations. More preferably, the load bearing flexible conduit comprises sufficient hoop strength to resist expansion in the radial direction due to pressure of fluid located in the throughbore of the conduit including hydrostatic pressure caused by the fluid located further above in the system. Preferably, the system is capable of transferring fluid or permitting the flow of fluid there through whether the load bearing flexible conduit is located on the reel or whether it has been payed out from the reel and further preferably, the at least one flexible coupling permits at least one of the said one ends of the respective first and second lengths of load bearing flexible conduit to move relative to the longitudinal axis of the joint whether there is pressurised fluid located in the throughbore of either or both of the joint and the at least one load bearing flexible conduit or whether there is an absence of pressurised fluid located in the throughbore of either or both of the joint and the at least one load bearing flexible conduit.

Preferably, each of the lengths of load bearing flexible conduit comprises a termination at each end, wherein the termination comprises a load transfer mechanism to transfer load from the termination to the load bearing outer layer of each of the lengths of the load bearing flexible conduit. Preferably, the termination also comprises a connection mechanism to connect the termination and thereby the load bearing flexible conduit to a connection mechanism on the respective joint such that the throughbore of the joint is in sealed fluid communication with the throughbore of the respective length of load bearing flexible conduit.

Preferably, the load transfer mechanism comprises a generally cylindrical ferrule member secured to the respective end of the respective length of load bearing flexible conduit and the respective load bearing outer layer of the respective length of load bearing flexible conduit is located over the ferrule member.

Preferably, the load transfer mechanism also includes a generally cylindrical body member having an enlarged diameter portion wherein the enlarged diameter portion further preferably comprises an angled inner surface against which can be located an angled member and which may be in the form of a wedge and which may further be formed from a potting compound or other suitable material. Most preferably, the load transfer mechanism further comprises embedding at least a portion of the load bearing member in the angled member formed from potting material between the ferrule member and the angled member and further preferably includes arranging an outermost end of the load bearing outer layer to be secured between one end (and preferably a wider end) of the said angled member and a cap member of the load transfer mechanism such that load is preferably capable of being transferred from the termination to the ferrule member to the cap member to the body member to the angled member to the load bearing outer layer(s).

Typically, the load bearing flexible conduit is generally formed of thermoplastic flexible hose and may further include a flexible metallic layer.

Preferably, the load bearing flexible conduit comprises a plurality of layers across its cross section and more preferably the layers are un-bonded. Preferably, each of the said layers are formed of (typically differing) thermoplastic material but may include one or more flexible metallic layers.

Preferably, the load bearing outer layer comprises an arrangement of high strength fibres and more preferably comprises an arrangement of aramid fibres. Preferably, the arrangement comprises a braided arrangement of aramid or para-aramid fibres formed in a layer along substantially the entire longitudinal length of the load bearing flexible conduit on the outer surface or sheath of the pressure reinforcement and fluid carrying inner layer(s). Preferably, the load bearing outer layer comprises a braided arrangement of aramid or para-aramid fibres and which are preferably formed in a criss-cross arrangement where a number of the fibres are wound in a first helical arrangement around the outer surface of the inner layer in one direction and a number of fibres are wound in a second helical arrangement in the other direction such that each helically arranged fibre crosses each of the other oppositely directed fibres by passing over or under the oppositely arranged fibres in a repeating manner. The load bearing outer layer(s) may be covered along most of its longitudinal length (but preferably not at its ends) by having an outer sheath extruded over itself, where the outer sheath is typically formed from polyurethane or similar material and provides a protective covering to the load bearing layer(s).

Typically, the system provides a sealed fluid passageway through the throughbore thereof for the transport of fluid between the vessel and the lower most, in use, end of the load bearing flexible conduit. Preferably the flexible conduit system is suitable for delivering fluids between a vessel on the surface of the sea to a subsea structure located below the sea typically on the seabed in relatively close proximity to a hydrocarbon well.

Preferably, the joint comprises two flexible couplings to permit each of the said one ends of the respective first and second lengths of load bearing flexible conduit to move with respect to the longitudinal axis of the joint.

Preferably, the flexible coupling of the joint comprises a ball member coupled to the joint body by at least one pivot member and more preferably two pivot members arranged diametrically opposite one another about the throughbore of the joint and permit the ball member to pivot about a plane that is parallel to the longitudinal axis preferably by an angle of between 1 and 45 degrees and more preferably by an angle of between 15 and 20 degrees and most preferably by an angle of in the region of 17 degrees.

Preferably, the joint further includes a seal member which may be biased toward each of the ball members to respectively seal against an innermost end face of the respective ball member and thereby form a seal between the end face of the respective ball member and the joint body, typically such that no matter the angle of pivot of the ball member with respect to the longitudinal axis of the joint, the throughbore thereof remains sealed with respect to the outer environment such that no fluid passing through the throughbore of the joint can escape to the outer environment.

Typically, each flexible coupling further includes a pivotally mounted end connection member coupled to each respective ball member by at least one and more preferably two respective pivot members and which are preferably arranged to couple the end connection member to the ball member at a location 90 degrees rotationally spaced apart from the location of the pivot members that couple the ball member to the joint body such that the end connection member can pivot with respect to the longitudinal axis of the ball member and/or the joint body by an angle of between 1 and 45 degrees and more preferably by an angle of between 15 and 20 degrees and most preferably by an angle of in the region of 17 degrees.

Preferably, the joint further includes a seal member which may be biased toward each of the ball members to respectively seal against an innermost end face of the respective ball member and thereby form a seal between the end face of the respective ball member and the end connection member, typically such that no matter the angle of pivot of the end connection member with respect to the longitudinal axis of the ball member or the joint body, the throughbore thereof remains sealed with respect to the outer environment such that no fluid passing through the throughbore of the joint can escape to the outer environment.

Typically, the load bearing flexible conduit of the flexible conduit system is a relatively lightweight load bearing flexible conduit such that the flexible conduit system does not require to be secured to an elongate cable to provide tensile strength when being deployed into the sea to traverse the sea water column between a vessel on the sea surface and the subsea surface.

According to another aspect of the present invention there is provided a method of delivering fluids between a first location and a second location through a body of water, the method comprising deploying a flexible conduit system in accordance with the first aspect of the present invention at the first location until it reaches the second location and pumping fluids through a throughbore of the flexible conduit system.

BRIEF DESCRIPTION OF THE DRAWINGS

Embodiments of the present invention will now be described, by way of example only, with reference to the accompanying drawings, in which:

FIG. 2b is a cross sectional end view of the load bearing flexible conduit of FIG. 2a;

FIG. 3b is an end view of the end hose connection of FIG. 3a;

FIG. 3d is a further cross sectional drawing of the end hose connection and load bearing flexible conduit of FIG. 3a but also showing the direction of force acting between a potting compound in the shape of a wedge and a braided strength member;

FIG. 3e is a close up and more detailed view of section e-e of FIG. 3d;

FIG. 3f is a close up and more detailed view of section f-f of FIG. 3e;

FIG. 6 is a side view of a prior art flexible conduit system being mounted upon a flexible conduit storage reel and being shown to have a relatively large MBR (and which is greater than the MBR of the load bearing flexible conduit system of FIG. 5c that is in accordance with the present invention);

FIG. 7c is a perspective view of a conventional HP swivel and which can be connected to the quick connect mechanism provided at one end of a load bearing flexible conduit as shown in FIG. 7a;

FIG. 7d is a hot stab connector and which again can be connected to one of the quick connectors of FIG. 7a should an operator of the flexible conduit system of FIG. 1 require that;

Figure 1:
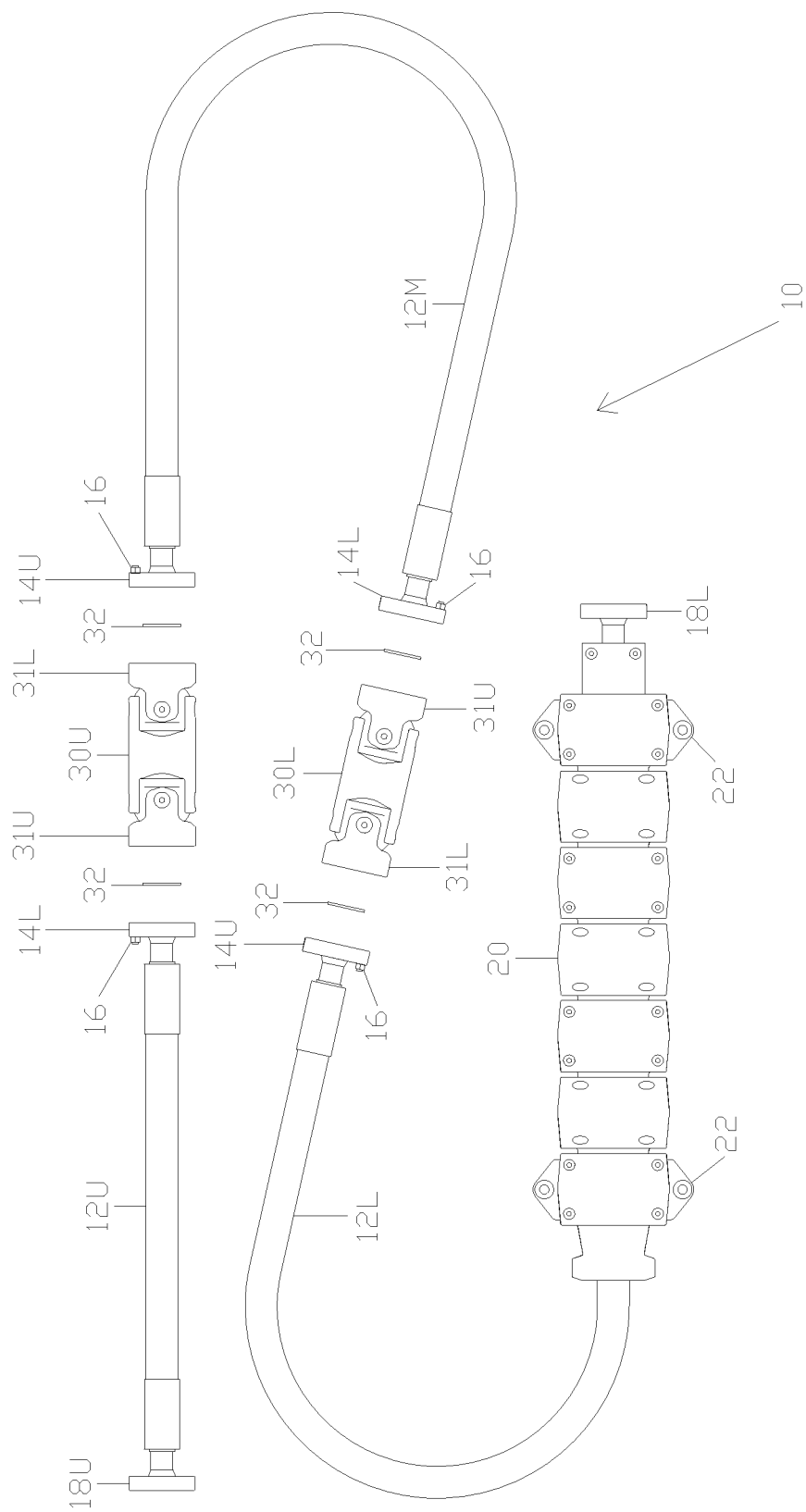
FIG. 1 is a side schematic view (not to scale) of a flexible conduit system in accordance with the present invention in an exploded view for clarity.

In the description that follows, like parts are marked throughout the specification and drawings with the same reference numerals, respectively. The drawings are not necessarily to scale. Certain features of the invention may be shown exaggerated in scale or in somewhat schematic form, and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

The following definitions will be followed in the specification. As used herein, the term "wellbore" refers to a wellbore or borehole being provided or drilled in a manner known to those skilled in the art. The wellbore may be 'open hole' or 'cased', being lined with a tubular string. Reference to up or down will be made for purposes of description with the terms "above", "up", "upward", "upper", or "upstream" meaning away from the bottom of the wellbore along the longitudinal axis of a work string toward the surface or from the bottom of the sea (i.e. in the region of the subsea surface) up toward the surface of the sea and "below", "down", "downward", "lower", or "downstream" meaning toward the bottom of the wellbore along the longitudinal axis of the work string and away from the surface and deeper into the well, whether the well being referred to is a conventional vertical well or a deviated well and therefore includes the typical situation where a rig is above a wellhead, and the well extends down from the wellhead into the formation, but also horizontal wells where the formation may not necessarily be below the wellhead or from the surface of the sea down toward the bottom of the sea (i.e. the subsea surface).

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention. Additionally, any feature disclosed in the specification can be combined alone or collectively with other features in the specification to form an invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

All numerical values in this disclosure are understood as being modified by "about". All singular forms of elements, or any other components described herein including (without limitations) components of the apparatus are understood to include plural forms thereof and vice versa.

DETAILED DESCRIPTION OF THE DRAWINGS

A flexible conduit system 10 in accordance with the present invention is shown in overall and schematic view in FIG. 1 and comprises a number of load bearing flexible conduit lengths 12 coupled end to end via flexible joints 30 in the form of fluid tight double cardanic joints 30 to make one elongate flexible conduit system 10 which can be used to transfer fluids in a sealed manner from one location to a second location typically through a body of water such as the water column between a reel 100 located on a vessel (not shown) on the sea surface and a subsea facility (not shown) such as a wellhead located on the seabed. The flexible conduit system 10 is also used to lower a distribution manifold or other clump weight (not shown), such as any suitable equipment utilised in subsea operations, to the seabed. Indeed, a clump weight of some description is required at the lower most end of the flexible conduit system 10 to ensure the flexible conduit system 10 is kept relatively vertical and under tension as it is lowered through the body of water.

It is important to note that the flexible conduit system 10 as shown in FIG. 1 is not to scale, particularly in relation to the length of each section of load bearing flexible conduit 12 which in reality are likely to be in the region of 1 inch to 3 inches in diameter and more preferably in the region of 2 inches in diameter but will likely be in the region of many hundreds of metres such as in the region of 300 or 600 metres in length per section of load bearing flexible conduit 12.

The flexible conduit system 10 comprises a number of components as shown in FIG. 1 in accordance with an aspect of the present invention as will now be described.

Figure 7A:
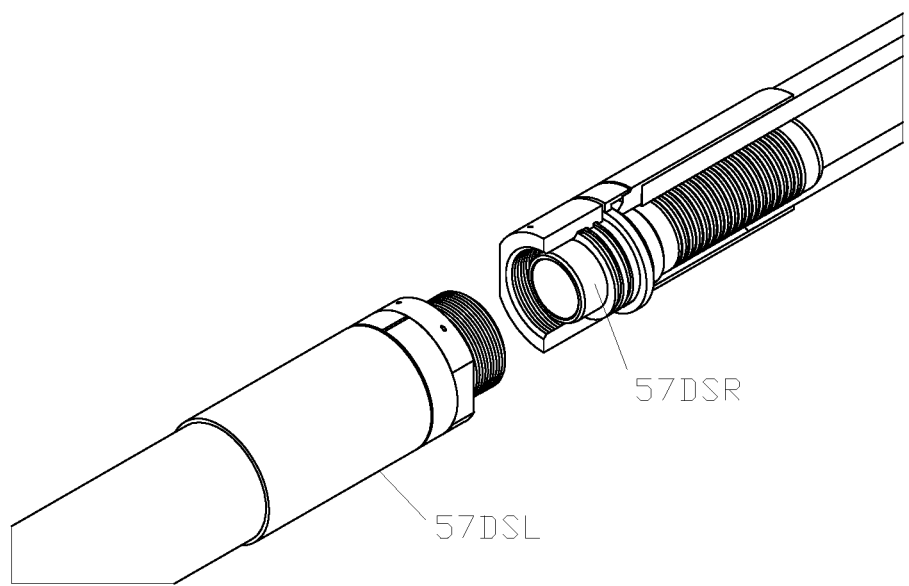
FIG. 7a is a perspective exploded view of an example of a quick connect mechanism provided at each end of adjoining load bearing flexible conduits of FIG. 1 and which will be connected to one another via a double cardanic joint (not shown in FIG. 7a but as shown in FIG. 4b)
Figure 7B:
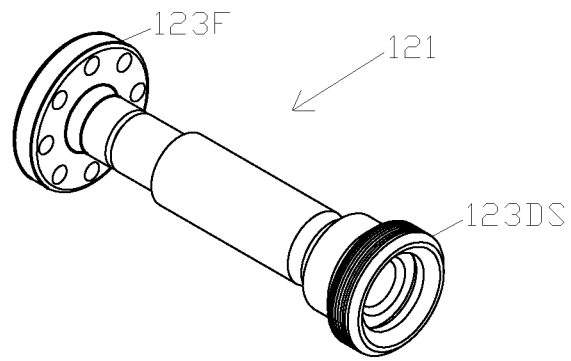
FIG. 7b is a perspective view of a cross over connector which can be coupled to one end of one of the quick connectors of FIG. 7a and which can be used to then connect the load bearing flexible conduit (typically the outboard end) to a customer's equipment.
Figure 7C:
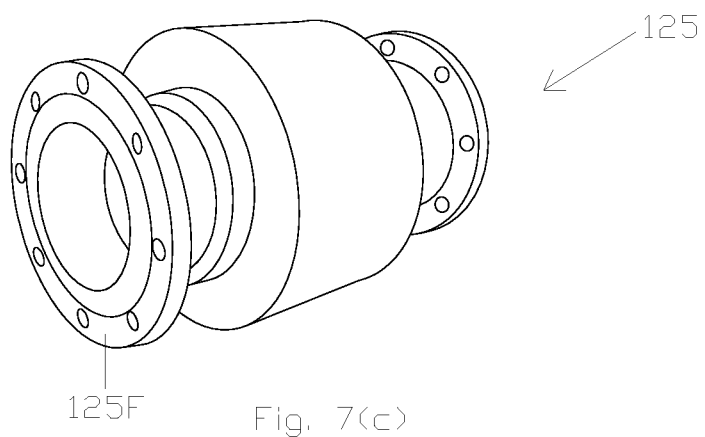
Figure 7D:
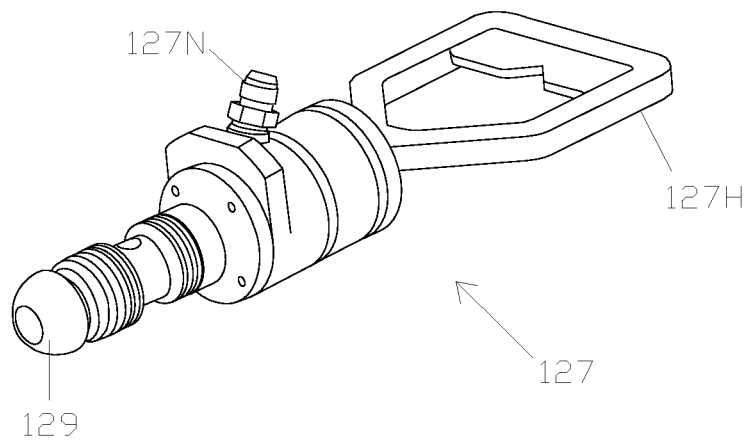

The flexible conduit system 10 comprises an uppermost load bearing flexible conduit 12U and which will be detailed subsequently and which comprises at its uppermost in use end an outboard hose termination 18U and will typically be chosen by the operator to have a suitable connection for connection with a fluid pump or other piece of equipment located e.g. on a vessel on the sea surface and to which the upper end 12U of the flexible conduit system 10 is to be coupled with in a fluid tight manner such that fluids can be pumped from e.g. the vessel on the sea surface down through the flexible conduit system 10 and out of the outboard hose termination 18L and into e.g. a subsea manifold or other piece of equipment located on the wellhead etc. The lowermost outboard hose termination 18L could be connected to any one of a number of different connectors such as a cross over connector 121, an HP swivel 125 or a hot stab connector 127 as shown in FIGS. 7b, 7c and 7d respectively and which are conventional in the subsea connection industry as being offered by a number of different companies.

The lower end of the uppermost load bearing flexible conduit 12U as shown in FIG. 1 comprises an inboard end hose termination or connection 14L having a flange and which is arranged for connection with a matching flange 31U provided at the upper end of the upper double cardanic joint 30U. In the arrangement as shown in FIG. 1, there are additional components that are required to make the connection between the inboard end hose termination 14L and the upper end 31U of the double cardanic joint 30U and such additional components are a suitable fixing means such as nut and bolt 16 arrangement and a seal ring 32 which provides for a fluid tight seal between the inner bore of the load bearing flexible conduit 12U and the inner bore 80 of the double cardanic joint 30U. However, in other more preferred embodiments, the flange 14L to flange 31U arrangement with nut and bolt 16 fixing means is replaced by a quick connection mechanism that permits the lower end 14L of the load bearing flexible conduit 12U to be coupled to the upper end 31U of the double cardanic flexible connecting joint 30 (which will be described in more detail subsequently) without any specialist connection equipment being required to make up the connection and such a quick connection mechanism is preferably in the form of the LOW PROFILE CONNECTION quick connect 57DSL and 57DSR offered by Hydrasun Limited of Aberdeen, UK, an example of which is shown in FIG. 7a.

A middle portion of the flexible conduit system 10 is then provided and comprises at least one middle load bearing flexible conduit 12M connected to a respective lower double cardanic joint 30L by a connection being formed between the lower inboard hose termination 14L being coupled to the upper end 31U of the double cardanic joint 30L with a similar arrangement of seal ring 32 and nuts and bolts 16. In a flexible conduit system 10 there may only be one such middle portion 12M, 30L and which may be in the region of 300 or 600 metres in length but in other flexible conduit systems (not shown) there may be two or more middle load bearing flexible conduits 12M and lower double cardanic joint 30L being coupled end to end to provide additional 300 or 600 metre lengths to the flexible conduit system 10 to permit the flexible conduit system 10 to be used in deeper water columns. In other words, if additional depth of water is to be traversed then successive additional middle portions 12M, 30L can be added into the flexible conduit system 10 to provide additional 300 or 600 metres in length to the flexible conduit system 10 as required, such that for example a plurality of 300 metre or 600 metre lengths of load bearing flexible conduits 12 can be flexibly coupled together by interleaving or intermediate cardanic joints 30 to provide a total length of the flexible conduit system 10 provided on one reel 100 of in the region of 1000 metres to potentially 3000 metres or greater to enable deep water and ultra deep waters to be traversed.

The flexible conduit system 10 further comprises a lower load bearing flexible conduit 12L, the upper end of which 14U comprises an inboard end hose termination 14U for fluid tight coupling to the lower end 3 IL of the double cardanic joint 30L via a similar seal ring 32 and nuts and bolt 16 arrangement. An outboard hose termination 18L is provided at the lowermost end of the lower load bearing flexible conduit 12L, where the lower outboard hose termination 18L comprises a suitable fixing such as that shown in FIG. 7b, FIG. 7c or FIG. 7d or any other suitable fixing in order to couple the lower end of the flexible conduit system 10 to a fluid coupling provided on the wellhead at the sea bed. In addition, a bend restrictor 20 is formed and provided around the outer surface of the lower end of the lower load bearing flexible conduit 12L in order to prevent over bending of the lower end of the load bearing flexible conduit 12L particularly to prevent over bending during connection to e.g. subsea equipment by a Remotely Operated Vehicle (ROV) (not shown). The bend restrictor 20 is provided with hose handling eyes 22 through which ropes or wires or the like can be attached in order to haul and/or support the lower end of the lower load bearing flexible conduit 12L and therefore the whole flexible conduit system 10 either when in connection with the fluid coupling (not shown) on the wellhead or when detached from the fluid coupling on the wellhead.

The upper load bearing flexible conduit 12U, middle load bearing flexible conduit 12M and lower load bearing flexible conduit 12L are all substantially identical with the exception of their respective end hose terminations 14U, 14L or outboard hose terminations 18U, 18L and the various load bearing flexible conduits, 12L, 12M, 12U are all typically of a similar diameter (such as in the region of 2 inches inner diameter) and similar length which may be in the region of 100 metres to one kilometre in length and more preferably in the region of 300 or 600 metres in length each for example. Such an arrangement provides many advantages to the flexible conduit system 10 in terms of inventory stock levels and efficiency of manufacture etc.

Uniquely the flexible conduit system 10 can be used to transport fluids between a vessel located on the sea surface and subsea equipment such as a wellhead provided at the mouth of a hydrocarbon reservoir where the wellhead is located on the seabed surface and can do so without requiring additional elongated loadbearing or tensile bearing or load bearing cables because they are provided with additional tensile reinforcement over and above the reinforcement that is normally provided within certain conventional flexible hose types, as will now be described.

Figure 2A:
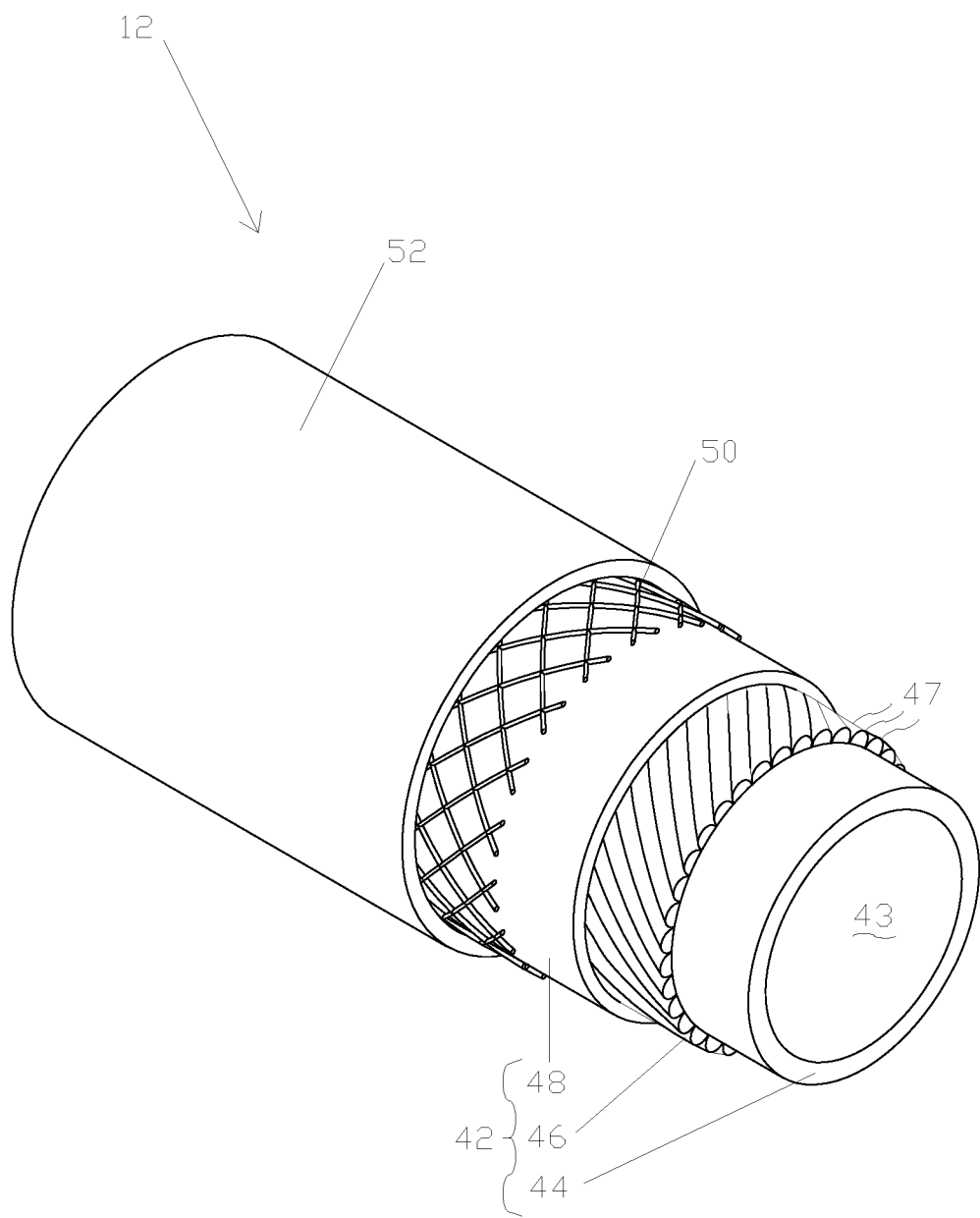
FIG. 2a is a perspective but stripped away view of a load bearing flexible conduit which forms part of the flexible conduit system of FIG. 1, where some of the various layers of the load bearing flexible conduit have been stripped away for clarity.

FIG. 2a shows a conventional flexible hose 42 with two additional layers 50, 52 in accordance with the present invention as will now be described. The conventional flexible hose 42 comprises at its innermost core, an annular and hollow hose liner 44 typically formed from NYLON 11 material (Registered Trade Mark) and the hose liner 44 thus provides a leak-proof liner to the flexible hose 42 such that fluids can be pumped through the throughbore 43 from an upper end of the load bearing flexible conduit 12 to a lower end thereof. A reinforcement anti-burst layer (which provides the flexible hose 42 and thus the load bearing flexible conduit 12 with a predetermined pressure rating) is then formed around the outer surface of the hose liner 44 and said layer is in the form of either a non-metallic fibre (e.g. an aramid fibre) or a metallic wire (e.g. carbon steel wire) hose reinforcement layer 46 where the plurality of aramid (e.g. Kevlar (Registered Trade Mark)) fibres or wires 47 are wrapped helically around the outer surface of the hose liner 44 in the same helical direction along the longitudinal length of the hose liner 44, the hose reinforcement layer 46 providing significant burst strength to the hose liner 44 such that very high pressure fluid can be pumped through the throughbore 43 safely without significant risk of the hose liner 44 and hose reinforcement 46 layer combination bursting. A hose outer sheath 48 typically formed of polyurethane material is extruded over the outer surface of the hose reinforcement layer 46 in order to protect the hose reinforcement layer 46 from wear and tear.

In accordance with the present invention, the conventional flexible hose 42 is then modified by providing a braided tensile reinforcement layer 50 along substantially the entire longitudinal length of the conventional flexible hose 42 on the outer surface of the hose outer sheath 48, where the tensile reinforcement layer 50 comprises a braided arrangement of high strength KEVLAR (Registered Trade Mark) fibres or other aramid and which are formed in a criss-cross arrangement where half of the fibres are wound in a first helical arrangement around the outer surface of the hose outer sheath 48 in one direction and the other half of the Kevlar fibres are wound in a second helical arrangement in the other direction such that each helically arranged fibre crosses each of the other oppositely directed Kevlar fibres by passing over or under the oppositely arranged KEVLAR (Registered Trade Mark) fibres in a repeating manner. Such a braided tensile reinforcement layer provided in a criss-cross arrangement provides very high axial load bearing capabilities to the overall load bearing flexible conduit 12 in accordance with the present invention such that not only can the load bearing flexible conduit 12 support its own weight but can also support the weight of a clump weight (not shown), required to keep the flexible conduit system 10 as straight as possible during deployment and retrieval, all of the various double cardanic joints 30L, 30U and the weight of the other load bearing flexible conduits 12L, 12M, 12U and also the weight of any fluid that is passing through the throughbore 43 whilst the flexible conduit system 10 traverses the water column and sits within the water column. The tensile reinforcement braided layer 50 is protected by having a layer of polyester tape (not shown) applied, preferably Mylar, to isolate it from an extruded outer sheath 52 typically formed from polyurethane provided over its outer surface and which thereby protects the braided tensile reinforcement layer 50 from wear and tear and snagging and being cut etc. In the embodiment shown in FIG. 2a and FIG. 2b, the tensile reinforcement layer 50 and the extruded outer sheath layer 52 are unbonded and can move relative to each other which ensures that the extruded outer sheath polyurethane layer 52 does not adhere to the aramid fibres of the tensile reinforcement layer 50 and therefore does not tear or shear under load.

Figure 2B:
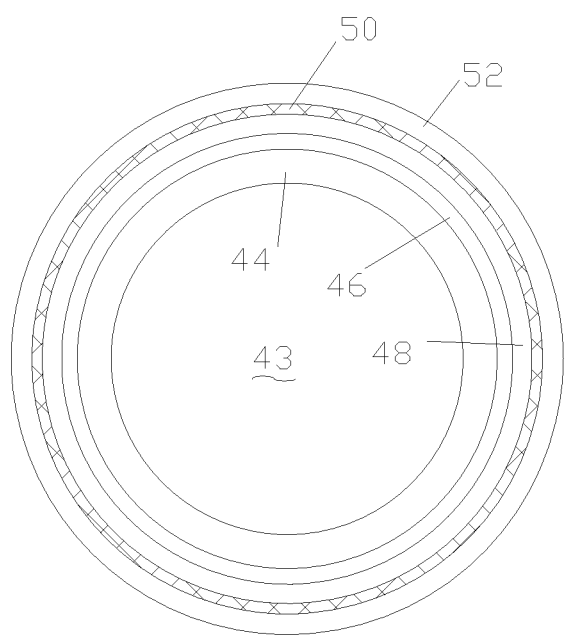

It should also be noted that the conventional flexible hose 42 could have a different construction than that shown in FIG. 2a and FIG. 2b and could for example be either non-metallic fibre or metallic wire reinforced, with either single layer or multi-layers of reinforcement, and could feature a metallic or non-metallic anti-collapse carcass. It should also be noted that the conventional hose 42 need not be an off the shelf hose 42 but could be a bespoke design of hose 42 but there is an advantage in using a conventional hose 42 in that conventional hoses 42 used in the subsea industry will already have been safety and quality certified to a particular pressure rating.

Accordingly, the load bearing flexible conduit 12 is generally formed of a plurality of layers across its cross section wherein each of the layers is preferably formed from (typically differing) thermoplastic material although it may further include a flexible metallic layer (not shown) if required for additional strength and/or other reasons, and more preferably the said layers are un-bonded.

In any event, the respective ends of the load bearing flexible conduits 12L, 12M and 12U are coupled to their respective terminations 14U, 14L, 18U, 18L utilising a similar connection termination arrangement in accordance with the present invention as will now be described with reference to FIGS. 3a and 3d, 3e and 3f in particular.

Figure 3A:
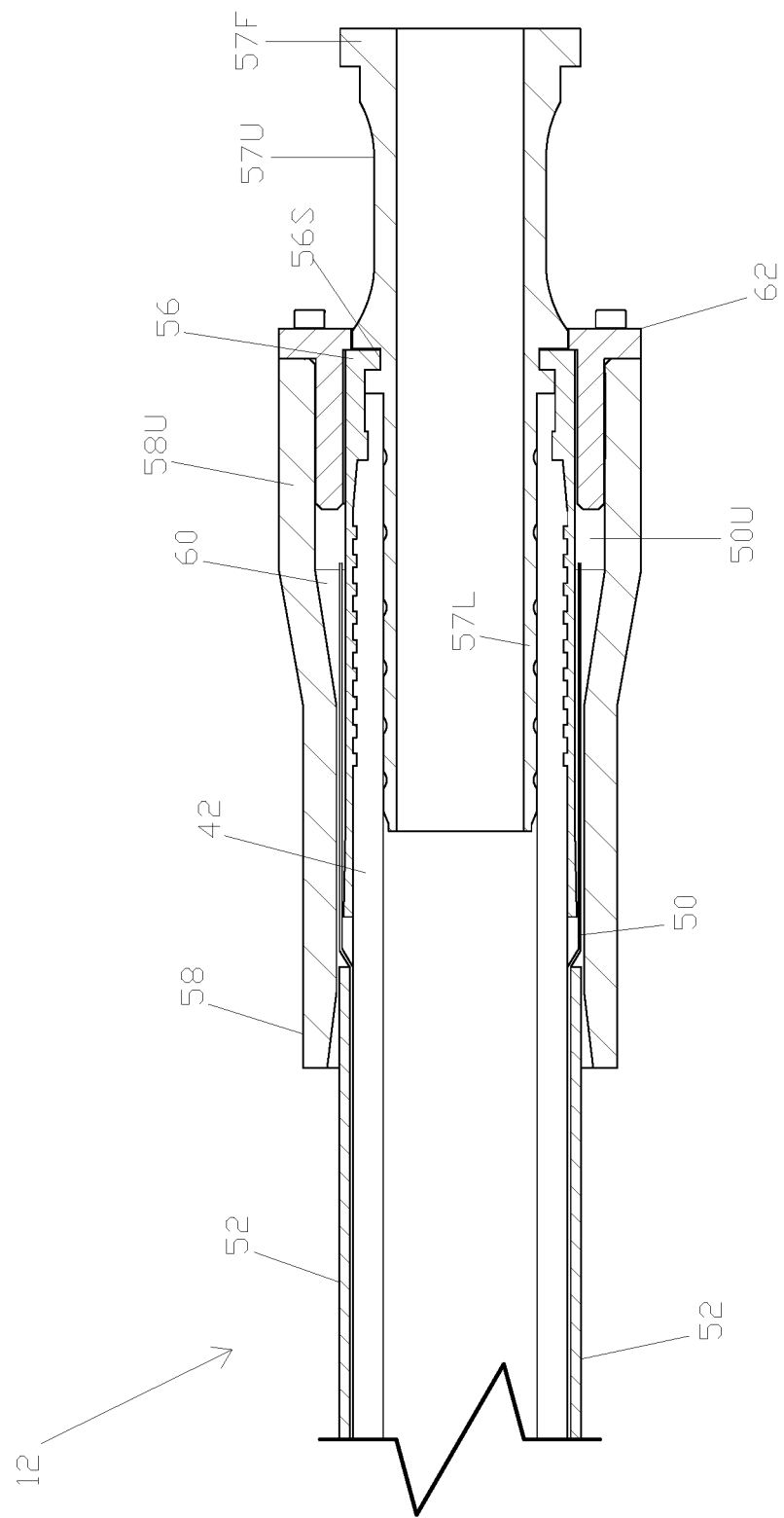
FIG. 3a is a cross sectional side view of an end of the load bearing flexible conduit of FIG. 2a with an end hose connection or termination attached thereto in accordance with the present invention.
Figure 3B:
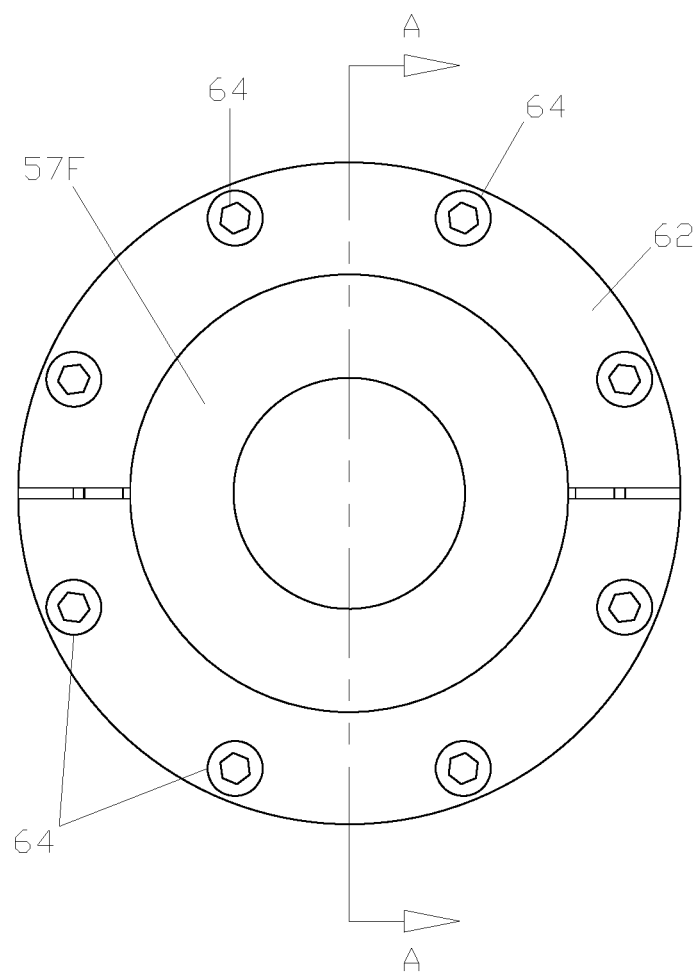
Figure 3C:
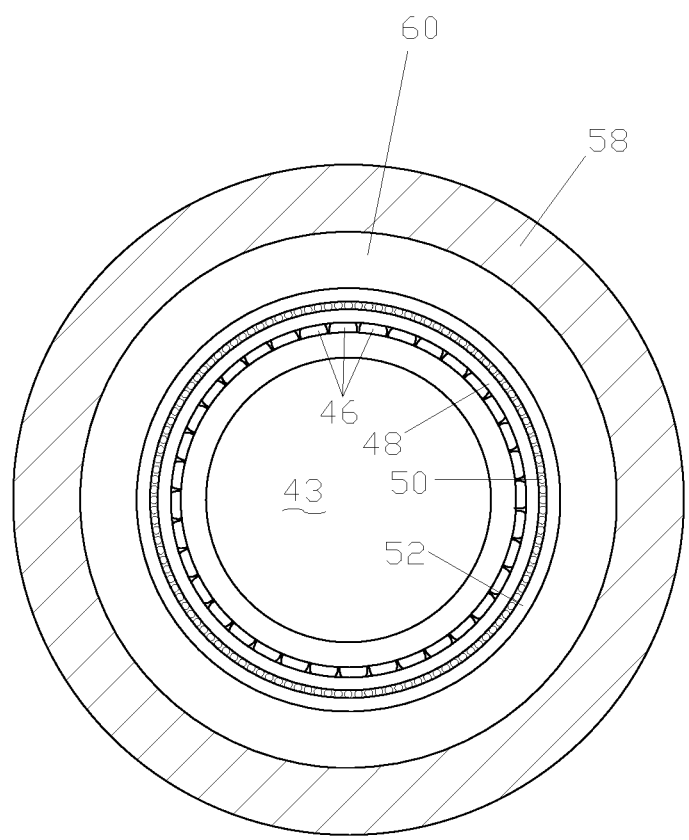
FIG. 3c is a cross sectional end view of the load bearing flexible conduit and the end hose connection of FIG. 3a taken on section line c-c of FIG. 3g.
Figure 3G:
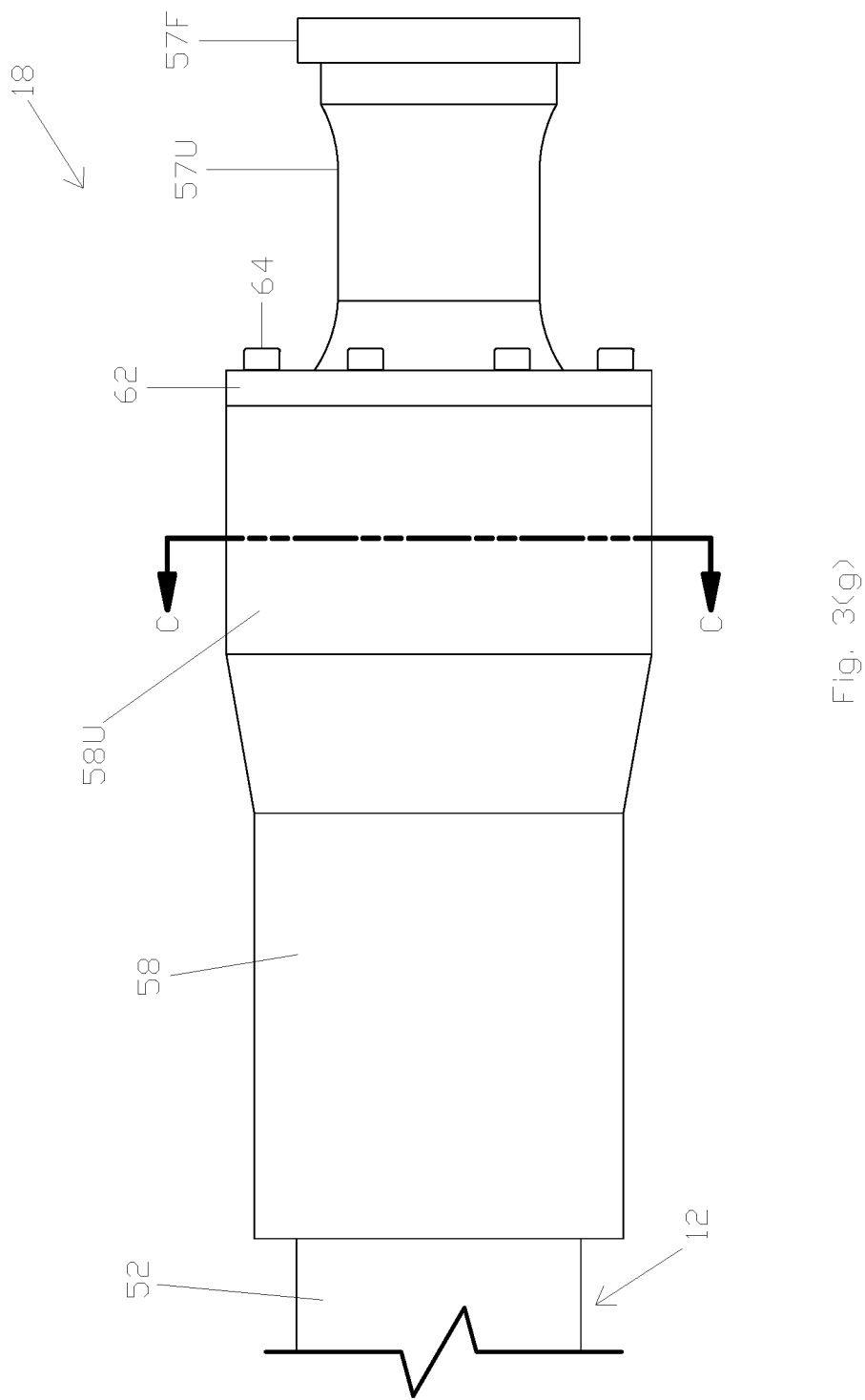
FIG. 3g is a side view of the outer surface of the end of the load bearing flexible conduit of FIG. 3a where line c-c is the sectional line of the view shown in FIG. 3c.

FIG. 3a shows the load bearing flexible conduit 12 after having been assembled and connected to an outboard hose termination 18U, 18L in accordance with the present invention. It should be noted that the flanged part 57F of a flanged insert 57 could be replaced by a suitable quick connector such as Hydrasun's LOW PROFILE CONNECTION quick connector (shown in FIG. 7a) but in FIG. 3d, the hose termination is an outboard hose termination 18. The flexible hose 12 is assembled to the hose termination 18 by having a cylindrical metal ferrule 56 crimped to its outer end, where an inwardly projecting end shoulder 56S butts up against the outermost end face of the flexible hose 12. In use, the ferrule 56 provides a contact surface area at each end of each flexible conduit 12 such that it will spread the area of contact when load is transferred from the load bearing flexible conduit 12 to the hose termination 18 and vice versa as will be subsequently described.

It is important to note that the end of the load bearing flexible conduit 12 is formed with the outer sheath 52 being cut back from the end of the flexible hose 12 to allow sufficient space for the ferrule 56 to be crimped into position. This exposes the high strength braided Kevlar layer 50 and which is temporarily secured to the outer surface of the crimped ferrule 56 using tape (not shown).

A potting body 58 which comprises a generally cylindrical body having a wider uppermost end 58U and a middle portion which comprises a tapered inner and outer surface 58M is then slid over the outer end of the flexible hose 12 such that it envelopes the flanged insert 57, the crimped ferrule 56 and also the end of the extruded outer sheath 52 and therefore also envelopes the exposed outer end of the braided Kevlar layer 50. During assembly of the hose termination 18, the assembler will then tension the braided Kevlar layer 50 by folding it over and back onto the Potting Body 58 and will then secure the Kevlar layer 50 with a clamping device (not shown).

The annulus that is formed between the inner surface of the wider end 58U and the outer surface of the ferrule 56 is filled with a potting compound 60 such that it forms a wedge shaped element 60 as shown in FIG. 3D. To aid such a filling process, the hose termination 18 is held vertically such that the potting compound 60 can be poured in from above. The potting compound 60 will then set in the wedge shape shown in FIG. 3D thus firmly securing the load bearing aramid fibres of the braided Kevlar layer 50 within the wedge shaped element 60. At this point the free end of the braided Kevlar layer 50 can be rolled up into the annulus above the wedge shaped potting compound 60 such that the upper end of the braided Kevlar layer 50 fills that annulus as shown by reference numeral 50U.

It should also be noted that the outer end of the ferrule 56 that comprises the shoulder 56S has at this point already been crimped into and therefore latched into an insert or a groove 57G (best seen in FIGS. 3a, 3d and 3e) formed in the outer surface of the flanged insert 57 around its mid point on its outer surface such that force supplied by load being applied on the flange 57F of the insert 57 in the axial or longitudinal direction is thereby transmitted to the ferrule 56 and vice versa.

The assembly of the hose termination 18 is then finished by fitment of a potting body cap 62 into the remaining annulus between the outer surface of the ferrule 56 and the inner surface of the wider diameter end of the potting body 58 such that the potting body cap 62 will likely pack down the rolled up end 50U of the braided Kevlar layer 50. The potting body cap is then secured to the potting body end 58U by suitable screws 64 and as can be seen in FIG. 3d, the potting body cap 62 comprises an inwardly projecting shoulder 62S which abuts against the outer end of the ferrule 56 and that abutment therefore permits axially directed force to transmit between the two components 56, 62.

Accordingly, load applied via the flange 57F (or via the LOW PROFILE CONNECTION connector as shown in FIG. 7a if it is provided in place of or instead of the flange 57F) is transmitted to the load bearing flexible conduit 12 by the following load transfer mechanism:

1) Load is applied via flange 57F say in the upwards direction (from left to right as shown in FIG. 3d);
2) that load is transferred from the insert 57 via the connection between the groove 57G and the shoulder 56S to the ferrule 56; the load is transferred from the ferrule 56 (from left to right as shown in FIG. 3d) to the potting body cap 62 (from left to right as shown in FIG. 3E) via the shoulder 62s due to the abutment there between in the latch area shown in FIGS. 3e and 3f;
3) the potting body cap 62 transmits the force and load to the potting body 58 via the cap screws 64;
4) as the potting body 58 tries to move or displace in the same direction as the applied load (i.e. from left to right as shown in FIG. 3d), the potting compound wedge 60 resists this load (i.e. in the radially outwards direction of arrows 59) and the load therefore transfers to the braided Kevlar layer 50;
5) the braided Kevlar layer is therefore moved upwards (from left to right as shown in FIG. 3d) and thus the load bearing flexible conduit 12 has the load transmitted to it and is therefore moved upwards as well (i.e. from left to right as shown in FIG. 3d) and thus the load is transferred across the termination 18 from the flange 57F (or LOW PROFILE CONNECTION connector) to the flexible hose 12 and therefore to the rest of the flexible conduit system 10.

Figure 4A:
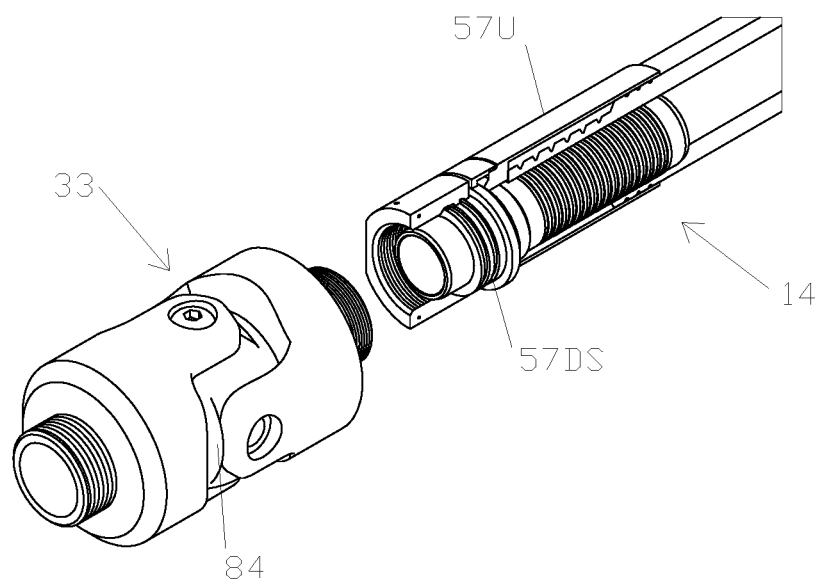
FIG. 4a shows a perspective exploded view of a single cardanic joint (being shown without a protective cover (that can be seen on the double cardanic joint of FIG. 4g) that would normally be covering the moveable components of the single cardanic joint of FIG. 4a) being offered up for coupling to a suitable quick connector coupling provided on an inboard end of the load bearing flexible conduit of FIG. 2a, where the single cardanic joint is in accordance with the present invention but is less preferred to the more preferred double cardanic joint of FIG. 4b.

FIG. 4a shows a less preferred single cardanic fluid tight joint 33 (as opposed to the more preferred double cardanic joint 30) where the main difference between the single cardanic joint 33 and the double cardanic joint 30 is that the single joint 33 only has one ball joint 84 as opposed to the two ball joints 83L, 83R of the double cardanic joint 30 as will be described subsequently. The single cardanic joint 33 is less preferred because it provides around 17 degrees of flex compared to around a total of twice that for the double cardanic joint 30 as will be described subsequently. Because the single cardanic joint 33 is less preferred, it will not be described in greater detail (as opposed to the more preferred double cardanic joint 30) but FIG. 4A also shows an inboard connection or inboard end hose termination 14 of FIG. 1 in more detail. The inboard end hose termination 14 is shown as having the quick connect LOW PROFILE CONNECTION 57DS as being securely connected to the flanged insert 57U by suitable welding or the like and thus the LOW PROFILE CONNECTION quick connect 57DS replaces the flange 57F as shown in FIG. 3d but otherwise the inboard end hose termination 14 as shown in FIG. 4a has all the other components of the outboard hose termination 18 as shown in FIG. 3d and thus provides a secure and loadbearing and load transferring connection between the single cardanic joint 33 or if used the double cardanic joint 30 and the load bearing flexible conduit 12 (not shown in FIG. 4a but which is coupled to the right hand end of the LOW PROFILE CONNECTION quick connect 57DS). The LOW PROFILE CONNECTION quick connect 57DS provides the great advantage over other connections that it is very quick for an operator to connect to the single 33 or double 30 cardanic joint and that quick connection can be made without specialist connection tools on for instance the deck of a sea going vessel.

Figure 4B:
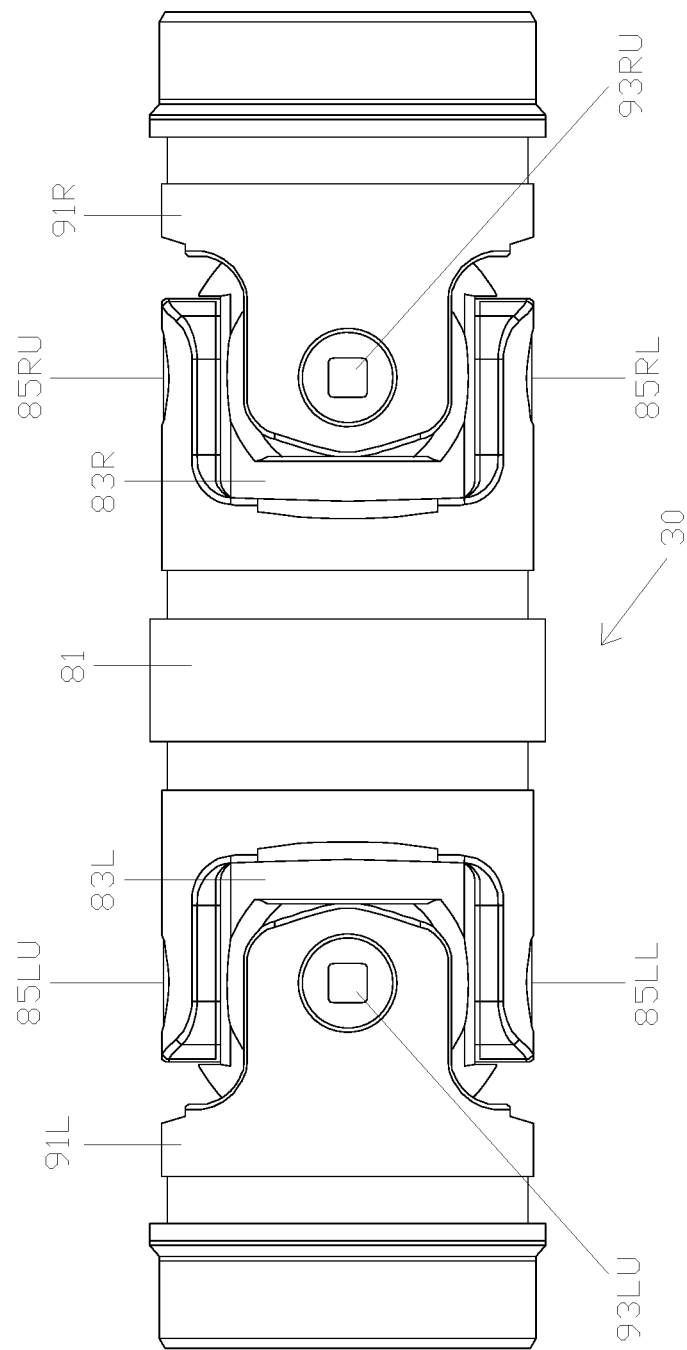
FIG. 4b is a side view of a more preferred double cardanic joint in accordance with the present invention and being shown without a protective cover which can be seen in FIG. 4g.
Figure 4C:
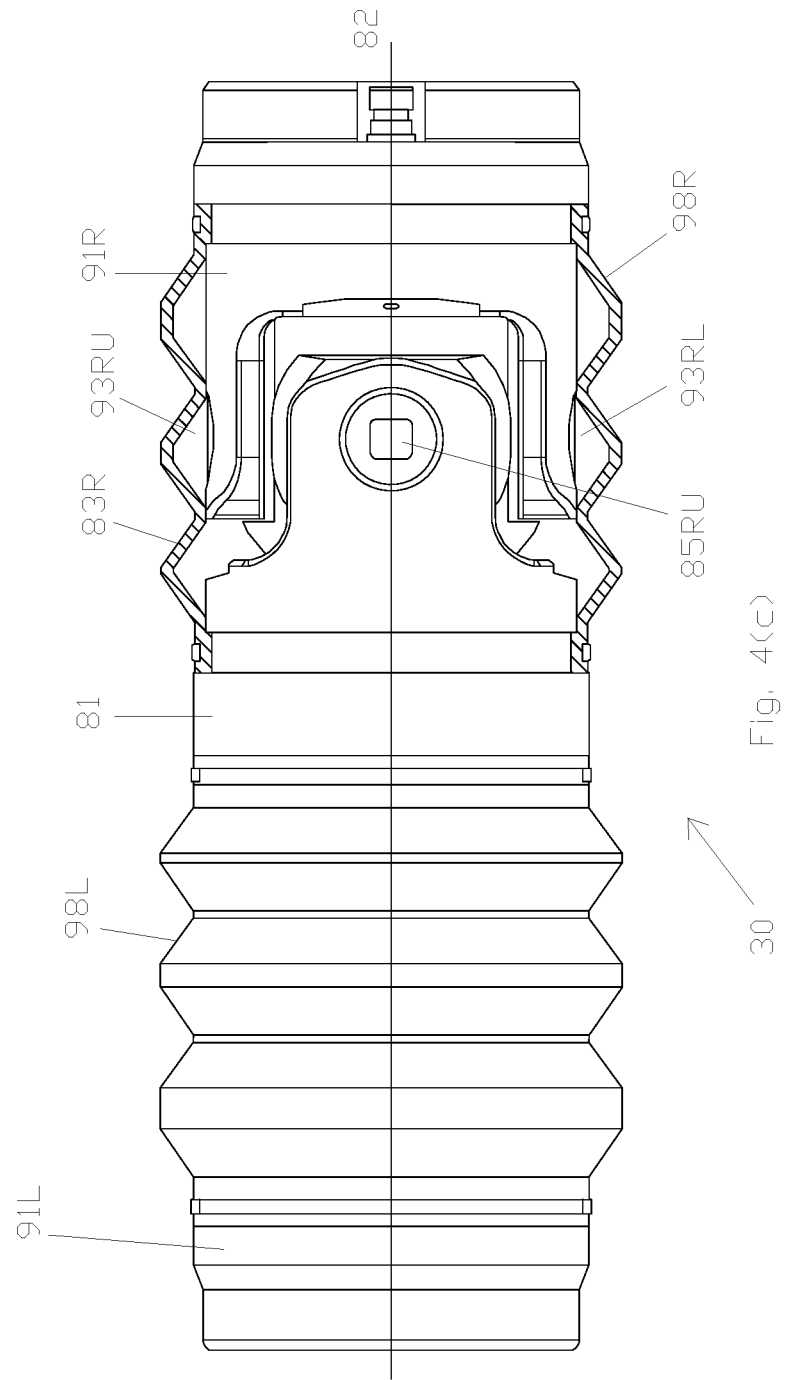
FIG. 4c is a further side view of the double cardanic joint of FIG. 4b but with one half of the double cardanic joint having the protective cover shown thereon and the other half of the double cardanic joint having the protective cover shown in cross section for clarity of the internal components.
Figure 4E:
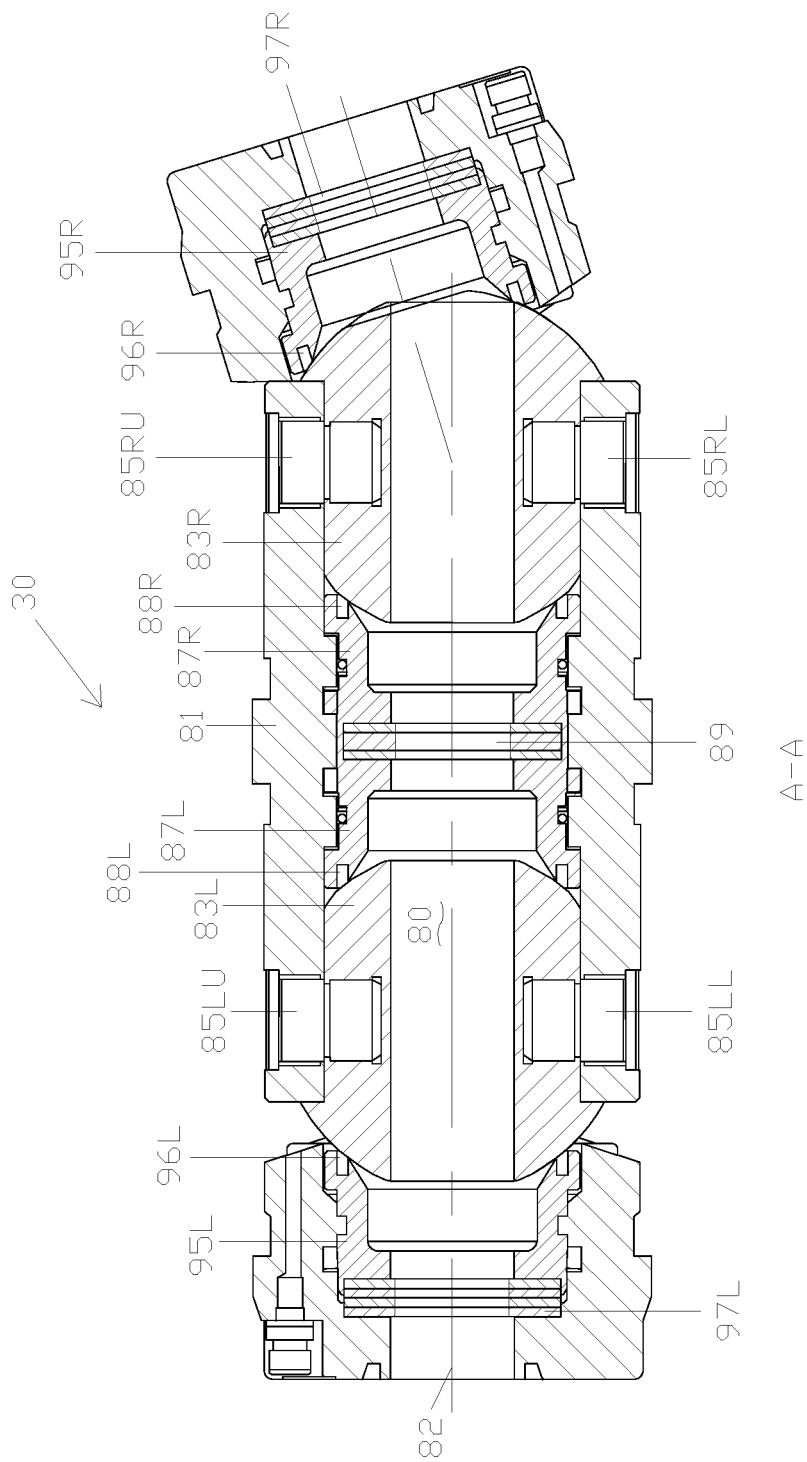
FIG. 4e is a cross sectional and more detailed view of the double cardanic joint of FIG. 4b, but with one end of the double cardanic joint (the right hand end) being shown at an angle.
Figure 4F:
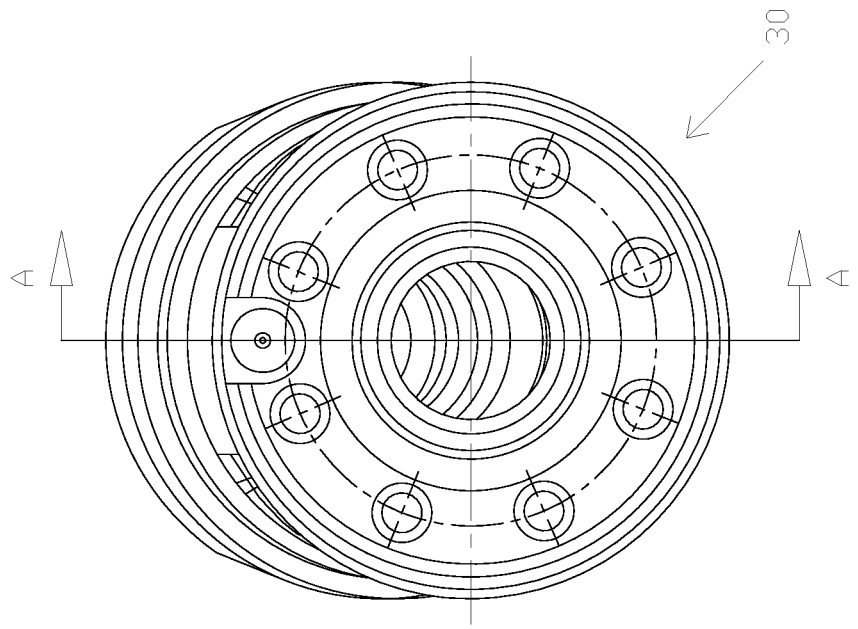
FIG. 4f is an end view of the double cardanic joint of FIG. 4e.
Figure 4D:
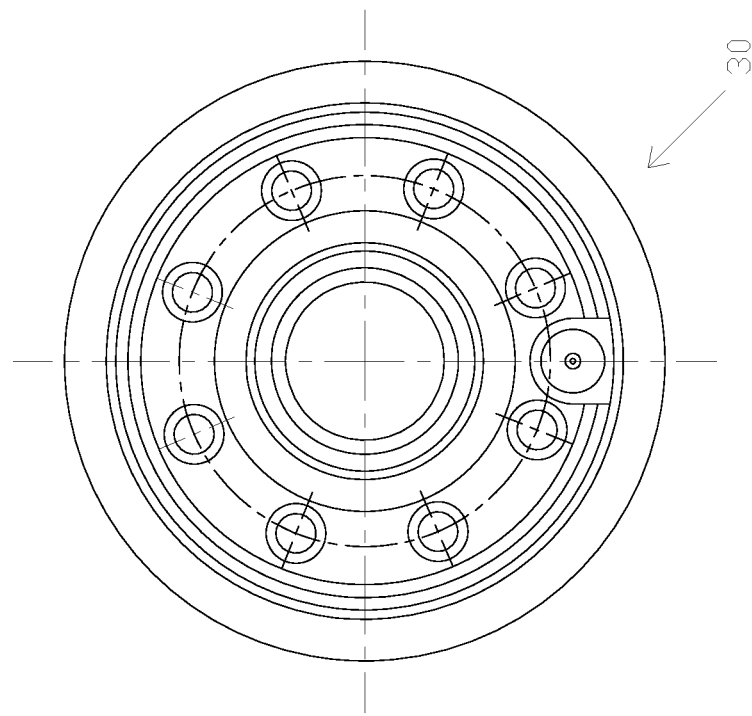
FIG. 4d is an end view of the double cardanic joint of FIG. 4c.
Figure 4G:
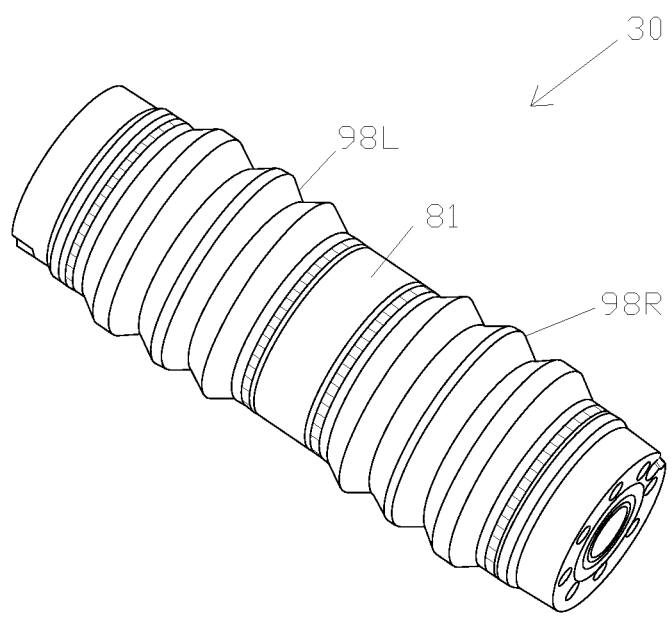
FIG. 4g is a perspective side view of the double cardanic joint of FIG. 4b but with both protective covers being shown in place over the movable components.

The more preferred double cardanic joint 30 is shown in more detail in FIGS. 4b and 4c and in particular in FIG. 4e and has a hollow generally cylindrical body housing 81 providing a throughbore 80 for fluid to pass therethrough and within the throughbore 80 of the body housing 81 are contained a pair of ball joints 83L, 83R where the ball joints 83L, 83R are respectively mounted to the cardanic joint body housing 81 by respective pivot pins 85LU, 85LL, 85RU, 85RL such that e.g. the left ball joint 83L is pivotally mounted to the body housing 81 by an upper pivot pin 85LU and a lower pivot pin 85LL where the pivot pins 85LU, 85LL are driven through the side wall of the body housing 81 and into the opposite sides of the ball joint 83L such that the pivot pins 85LU, 85LL are diametrically opposite one another and permit the ball joint 83L to pivot about a plane that is parallel to the longitudinal axis 82 in the region of 10 to 20 degrees and preferably in the region of 17 degrees. A respective spring loaded seal housing 87L and 87R are provided for each of the ball joints 83L, 83R as shown in FIG. 4e, where the housing 87L, 87R comprises a seal ring 88 mounted on its outermost end face where the seal ring 88L, 88R respectively seals against the innermost end face of the respective ball joint 83L, 83R such that no matter the angle of pivot of the ball joint 83L, 83R, the throughbore 80 remains sealed with respect to the outer environment such that no fluid passing through the throughbore 80 can escape to the outer environment. The sealing effect provided by the seals 88L, 88R is maintained because of Belleville springs 89 which act to force the seal housings 87L, 87R away from one another and toward their respective ball joint 83L, 83R. Thus, the seal rings 88L, 88R are maintained in constant contact with their respective ball joint end face 83L, 83R and thereby seal the throughbore 80.

Furthermore, the double cardanic joint 30 comprises a pivotally mounted end connection unit 91L, 91R coupled to each respective ball joint 83L, 83R by a pair of respective pivot pins 93LU, 93LL (note—this reference is not seen in the Figures but refers to a pivot pin hidden below the pivot pin 93LU shown in FIG. 4b), 93RU, 93RL where, as best shown in FIG. 4c, the pivot pins 93RU, 93RL project through the side wall of the end connection unit 91R in a direction perpendicular to the longitudinal axis 82 into the sidewall of the ball joint 83R at a location 90 degrees rotationally spaced apart from the pivot pins 85RU, 85RL such that the end connection unit 91R, 91L can pivot in the region of 10 to 20 degrees and most preferably in the region of 17 degrees as shown in FIG. 4c of the longitudinal axis 82.

A further spring loaded seal housing 95L, 95R is mounted within each respective end connection unit 91L, 91R where the spring loaded seal housing 95L, 95R has a seal ring 96L, 96R mounted on its inwardly directed end face and which is in constant sealing contact with the outer end face of each respective ball joint 83L, 83R such that the throughbore 80 of the cardanic joint 30 is sealed with respect to the outer environment such that no fluid passing through the throughbore 80 can escape past the respective seal 96L, 96R. Each seal housing 95L, 95R is biased toward the centre of the cardanic joint 30 and therefore toward one another by respective Belleville springs 97L, 97R such that each seal ring 96L, 96R is forced against the outer end face of the respective ball joint 83L, 83R to further increase the effect of the seal.

A flexible cover 98L, 98R such as formed from rubber is provided over the outer surface of each respective ball joint 83 in order to protect the moveable ball joints 83 and their respective pivot pins 85, 93 from the outer environment and seawater etc.

Accordingly, the double cardanic joint 30 permits each pivotally mounted end connection unit 91L, 91R to move from lying on the Y axis (e.g. unit 91R as shown in FIG. 4b) to pivot up toward the X axis (e.g. unit 91R has moved off the Y axis by 17 degrees as shown in FIG. 4e) due to the pivot pins 93 and additionally can be thought of providing for pivoting movement from the Y axis up toward the Z axis by virtue of the pivot pins 85 by for example 10 to 20 degrees and most preferably by 17 degrees.

Figure 5A:
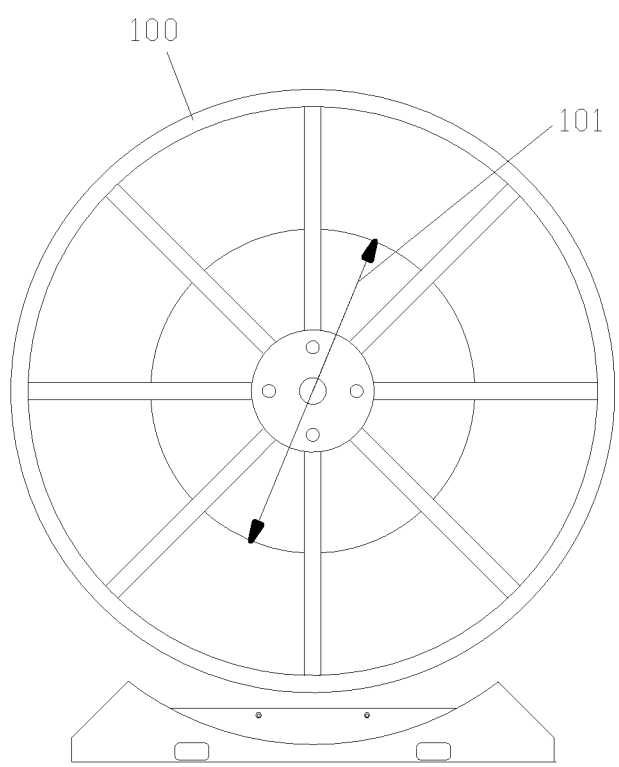
FIG. 5a is a schematic side view of a load bearing flexible conduit storage reel upon which the flexible conduit system of FIG. 1 in accordance with the present invention will be reeled and stored.
Figure 5B:
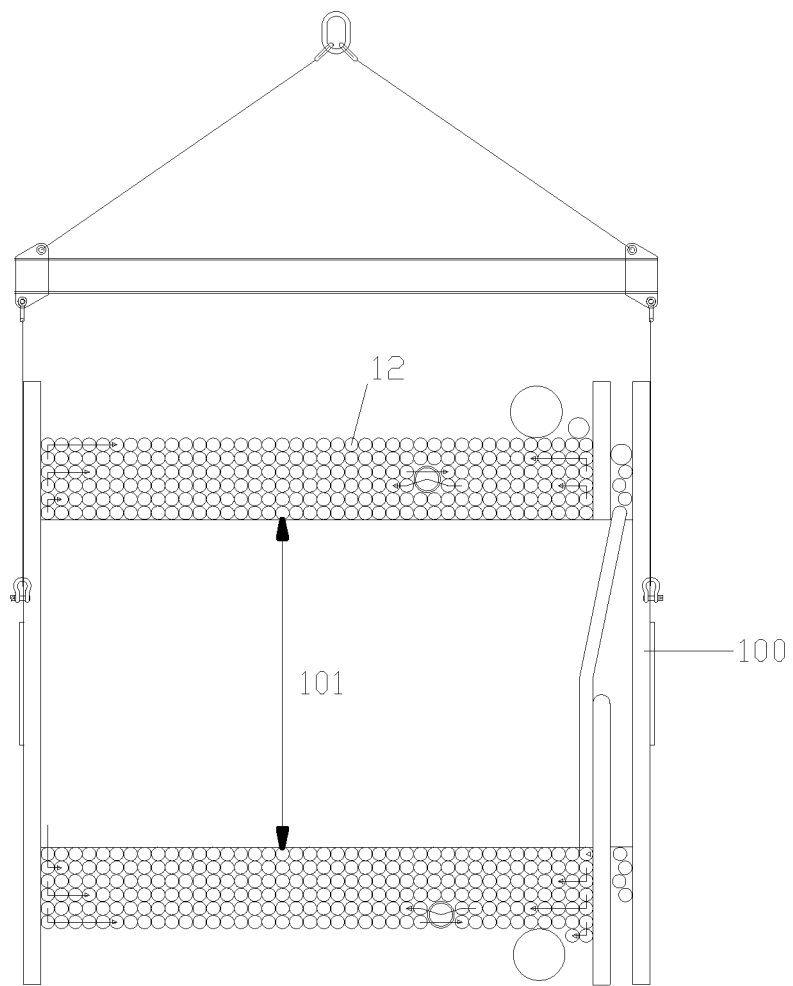
FIG. 5b is a cross sectional end view of the load bearing flexible conduit storage reel of FIG. 5a being shown with two or more load bearing flexible conduits coupled together and being mounted thereon.

Accordingly, the cardanic joint 30 has the great advantage that it provides a high degree of flexibility at the point of coupling of one load bearing flexible conduit, e.g. 12M to another load bearing flexible conduit, e.g. 12U as shown in FIG. 1 of around a total of 34 degrees and this provides great advantages when the load bearing flexible conduit 12M, 12U is mounted upon a hose storage reel 100 as shown in FIG. 5a when compared with the prior art hoses as will now be described.

A prior art arrangement of a non-flexible coupling 110 that is currently used in the oil and gas subsea industry to couple two conventional flexible hoses 112 to one another is shown in FIG. 6 where the non flexible prior art coupling 110 means that each end of the pair of hoses 112 to be coupled to one another must enter the non flexible prior art connection 110 on the same longitudinal axis and therefore such a prior art non flexible coupling 110 means that such a flexible hose 112 must be wound onto a hose reel 109 with a relatively large diameter drum 109 because the flexible hose 112 has a relatively large minimum bend radius (to do so on a smaller drum would risk damaging the hose 112 at the point of entry into the prior art connection 110). Additionally, it can be seen in FIG. 6 that there is a relatively large amount of dead space 114 taken up because the flexible hose 112 must more gradually bend around the conventional hose reel 109.

Figure 5C:
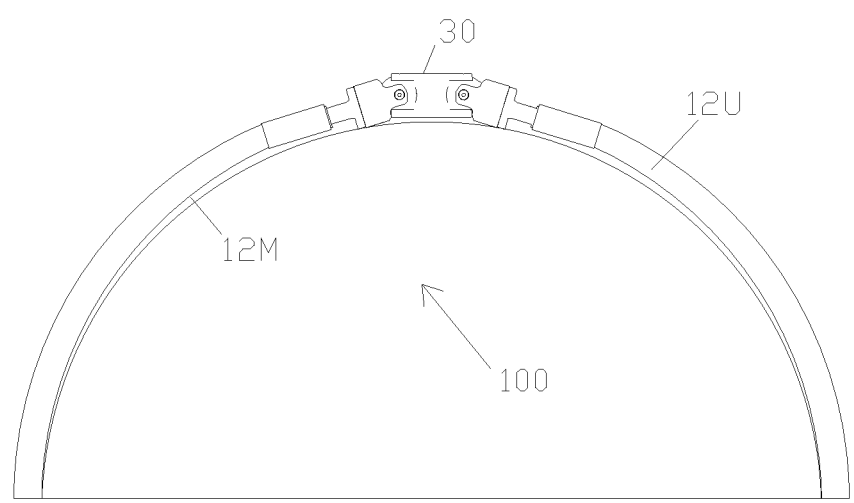
FIG. 5c is a side view of the flexible conduit system of FIG. 1 in accordance with the present invention being located upon and stored upon the load bearing flexible conduit storage reel of FIG. 5a (and being shown to have a relatively small Minimum Bend Radius (MBR)

In contrast, and as seen in FIG. 5c, the more preferred double cardanic joint 30 utilised in embodiments of the present invention provides great flexibility at the point of connection between two load bearing flexible conduits, 12U, 12M in accordance with the present invention and this therefore provides the great advantage to embodiments of the present invention that they can be wound onto hose reels 100 that have a much smaller drum diameter 101 than is possible with conventional non-flexible couplings 110 as shown in FIG. 6 of the prior art. Accordingly, embodiments of the present invention provide the great advantage that greater lengths of hose 12 can be wound onto a hose reel drum 100 for a given final outer diameter and/or provide the great advantage that smaller final outer diameter drums can be used than would otherwise be possible and therefore such hose reels 100 in accordance with the present invention can be used in situations where they would otherwise not be possible such as to fit into the freight hold of a Boeing 747 air transporter. This means that embodiments of the present invention can be quickly flown around the world to deal with accidents that have occurred in the oilfield. Accordingly, embodiments of the present invention have the great advantage that load bearing flexible conduit 12 is sufficiently flexible such that it is capable of being stored, prior to use, on the reel 100 and is further capable of being at least partially or fully payed out from the reel 100 into the body of water below the vessel during use. Moreover, the system 10 provides a sealed fluid passageway through the throughbore 43, 80 thereof for the transport of fluids between the vessel and the lowermost, in use, end of the load bearing flexible conduit 12. In addition, the load bearing flexible conduit 12 is capable of bearing the weight of itself and all the joints 30 located below it and in addition is capable of bearing the weight of all the other load bearing flexible conduits 12 located below it in the system 10 and in addition is capable of bearing the weight of the fluid located in the throughbore of the joints 30 and the load bearing flexible conduits 12. Moreover, the load bearing flexible conduit 12 comprises sufficient hoop strength to resist expansion in the radial direction due to pressure of fluid located in the throughbore 43 of the conduit including hydrostatic pressure caused by the fluid located further above in the system 10. In addition, the system 10 is capable of transferring fluid or permitting the flow of fluid therethrough whether the load bearing flexible conduit 12 is located on the reel 100 or whether it has been payed out from the reel 100 and the joints 30 permit the ends of the respective first and second lengths of load bearing flexible conduit 12 to move relative to the longitudinal axis of the joint 30 whether there is pressurised fluid located in the throughbore 43, 80 of either or both of the joint 30 and the respective load bearing flexible conduit 12 or whether there is an absence of pressurised fluid located in the throughbore 43, 80 of either or both of the joint 30 and the respective load bearing flexible conduit 12.

FIG. 7a shows a pair of LOW PROFILE CONNECTION quick connectors 57DSL, 57 DSR being brought toward one another and a double cardanic joint 30 (not shown in FIG. 7a) will be placed in between them to connect the two LOW PROFILE CONNECTION connectors 57DSL, 57DSR and their respective load bearing flexible conduits 12M, 12U (not shown in FIG. 7a), where the cardanic joint 30 is provided with a suitable coupling according to the project's specific requirements, one preferred example of which may be a LOW PROFILE CONNECTION mating coupling to provide the quick connection with the LOW PROFILE CONNECTION connectors 57DSL, 57DSR.

Alternatively, in an alternative embodiment of the present invention, the pair of LOW PROFILE CONNECTION quick connectors 57DSL, 57DSR shown in FIG. 7a are brought toward one another and are coupled directly to one another (i.e. without a flexible joint such as a cardanic joint 30 being located therein between) to provide a rigid coupling or connection (i.e. substantially non-flexible coupling) between two adjacent load bearing flexible conduits 12 and this embodiment finds utility particularly where smaller reels (not shown) are used to e.g. hold one length per smaller reel of for example 300 to 600 metres of load bearing flexible conduit 12 (rather than having a total of say 3000 metres of a flexibly coupled plurality of load bearing flexible conduits 12 on one reel 100 as shown in the above described embodiment disclosed in FIGS. 1 and 5c)). In this alternative embodiment, the flexible coupling (such as that provided by the cardanic joint 30) is not required because only one length of load bearing flexible conduit 12 is stored on each such smaller reel. Instead, a number of such smaller reels is provided on the back deck of the surface vessel, and so whilst this alternative embodiment doesn't have the advantage of reducing the footprint taken up by the reel(s) on the back deck of the surface vessel, operators may prefer it because smaller reels are likely more easily capable of fast air freight transportation in case of use in an emergency. In this alternative embodiment, the first load bearing flexible conduit 12 would be payed out from its respective reel over the side of the sea going surface vessel by use of a suitable mechanism until it is near fully payed out from it's reel (albeit the outboard end is now being hung off on the deck equipment.). At that point, the operator would connect the inboard end of the near fully payed out (first or lowermost) load bearing flexible conduit 12 from the first reel to the outboard end of the (second or next higher) load bearing flexible conduit 12 from the second reel by any suitable coupling (such as a rigid coupling (such as the connection formed by connecting LOW PROFILE CONNECTION quick connectors 57DSL, 57DSR as shown in FIG. 7a directly to one another)), such that the pay off mechanism can then lower the now coupled first and second load bearing flexible conduits 12 such that the upper end of the first load bearing flexible conduit 12 is payed out into the water and the second load bearing flexible conduit 12 begins being payed into the water. This embodiment does have the disadvantage that the coupling between the load bearing flexible conduit 12 needs to be made up on the sea going surface vessel and will need to be tested prior to being payed into the water (rather than have the ability to test all the flexible cardanic joint couplings 30 on land prior to being transported onto the sea going vessel as with the first described embodiment shown in FIG. 5c)) but again the operator may prefer it for the reasons set out above.

FIG. 7b shows a cross over connector 121 and which comprises a flange 123F at one end and a LOW PROFILE CONNECTION connector 123DS at the other end and which can be used to provide a cross over between a flange 57F or a LOW PROFILE CONNECTION connector 57DS. Accordingly, the flanged end 123F can be coupled to the flange 57F of an outboard hose termination 18L to provide a LOW PROFILE CONNECTION connector 123DS should that be required or alternatively the LOW PROFILE CONNECTION connector 123DS can be coupled to a LOW PROFILE CONNECTION connector 57DS to provide a flanged end 123F should an operator require that.

FIG. 7c shows an HP (high pressure) swivel 125 and which comprises a flanged end 125F which can be coupled to an outboard hose termination 18L should an operator require such a conventional HP swivel 125 to be included in the flexible conduit system 10 to permit full rotation of the flexible conduit system 10 about its longitudinal axis.

Additionally, FIG. 7d shows a hot stab connector 127 having a hot stab end 129 which can be inserted into a hot stab port (not shown) provided on a wellhead connector (not shown) by e.g. an ROV, where a Low Profile Connection Connector 57DS provided on the lower end 18L of the lower flexible conduit 12L can be coupled to nipple 127N and an ROV can be used to grasp handle 127H in order to stab end 129 into the hot stab port.

Figure 8A:
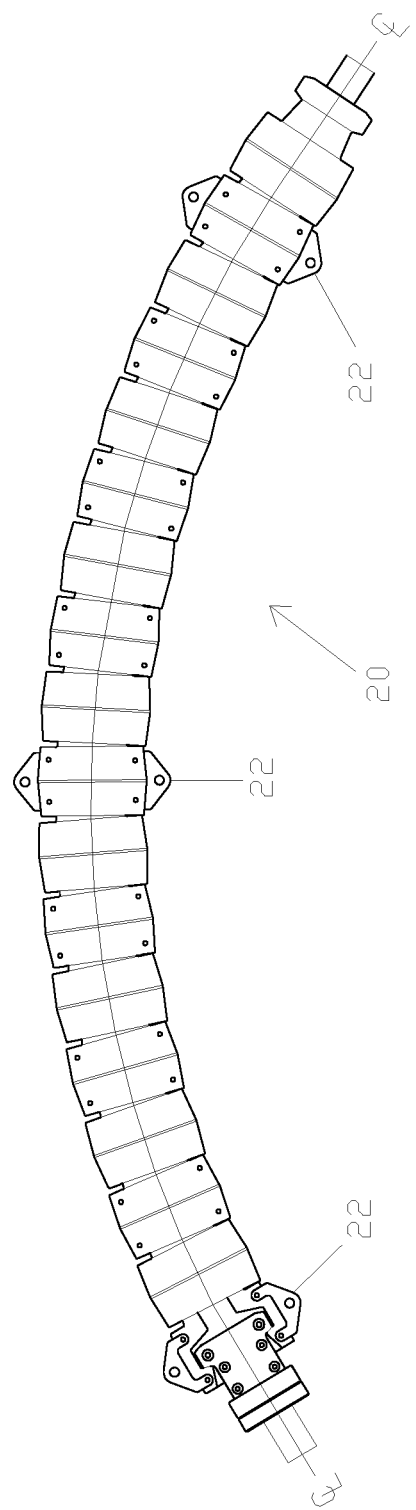
FIG. 8a is a side view of a load bearing flexible conduit of the flexible conduit system in accordance with the present invention of FIG. 1 being provided with a bend limiter on its outer surface to protect the load bearing flexible conduit from over bending at that location.
Figure 8B:
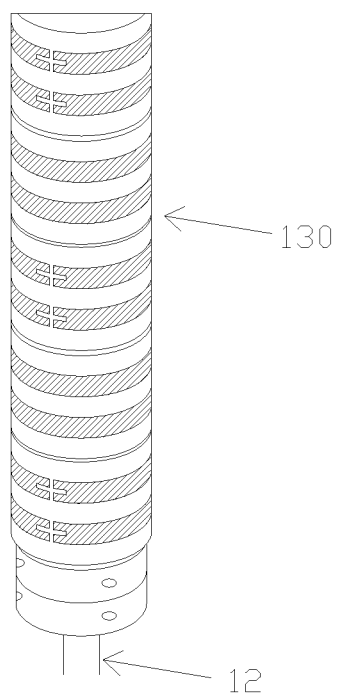
FIG. 8b shows a load bearing flexible conduit of the flexible conduit system of FIG. 1 being provided with distributed buoyancy aids as and when required.

A bend restrictor 20 is shown in more detail in FIG. 8a and further shows the hose handling eyes 22 as previously shown in FIG. 1 to permit ease of handling of the lower end of the flexible conduit system 10.

If required, an operator can provide distributed buoyancy aids 130 around the outer circumference of the load bearing flexible conduit 12 at one or more locations along the length of the flexible conduit system 10 and thus embodiments of the present invention provide the great advantage over conventional flexible hose 112 clamped or tethered to a steel cable from e.g. a crane or reeler unit because such conventional arrangements would have much more difficulty in being able to have such distributed buoyancy aids 130 mounted on them.

Accordingly, embodiments of the present invention provide many advantages over the prior art. In particular, the flexible double cardanic joint 30 reduces the stress on the load bearing flexible conduit 12 and enables the use of a much smaller drum 101 on the hose storage reel 100. Furthermore, the load bearing flexible conduit 12 is much lighter and has higher tensile strength than conventional flexible hoses 112 plus crane lift wire clamped thereto every 15 metres or so. The load bearing flexible conduit 12 in accordance with the present invention can also be utilised for a wide range of applications including well stimulation/cleaning, dispersant injection and pipeline commissioning or maintenance and indeed embodiments of the present invention of load bearing flexible conduit 12 are light enough to be neutrally buoyant in seawater and also if required by using a steel wire reinforced hose to provide a heavier conduit to e.g. resist tidal movement and thereby provide increased stability through the water column. Furthermore, it is possible to have variable tensile strength provided by varying the weight, weave and/or number of layers of the braided Kevlar layer 50. Additionally, a quick connect which most preferably is in the form of the LOW PROFILE CONNECTION (Trade Mark) 57DS offered by Hydrasun Limited of Aberdeen, UK provides a quick and straightforward connection for the inboard connections 14 and where the outboard hose terminations 18 can be adapted to suit the particular customer's requirements.

The double cardanic joint 30 provides a significant reduction in the core diameter of the drum 101 such as in the region of 30% reduction in the core diameter of the drum 101 and in addition the stresses experienced by the load bearing flexible conduit 12, particularly in the region of the end terminations are particularly alleviated. Therefore, the small minimum bend radius compared to prior art conventional non-load bearing flexible hoses 110, 112 (such as the prior art arrangement shown in FIG. 6) therefore provides the great advantage that it facilitates the use of a wider range of vessels because there is a reduced deck size requirement and reduced crane capacity requirement when using the embodiments of flexible conduit system 10 in accordance with the present invention. Additionally, the flexible conduit system 10 enables faster deployment and recovery through the water column because it does not need to be clamped to a separate tensile member such as a steel wire from e.g. a crane or reeler unit. Additionally, the load bearing flexible conduit 12 used in embodiments of the present invention will provide a superior fatigue life compared to coiled tubing or non metallic composite pipes and therefore it can be used in a higher number of operations. Additionally, the lightweight nature of the neutrally buoyant load bearing flexible conduit 12 facilities the ease of handling and reduces costs associated with equipment required for handling heavyweight conventional flexible hoses. Additionally, it provides for safer deployment because no operators need to be standing near the deck edge or moon pool lip of the vessel and furthermore the flexible conduit system 10 provides a single downline which allows fluid transfer through the throughbore 43; 80 thereof and also has sufficient load bearing strength to provides for physical equipment deployment from the vessel to the subsea surface.

Modifications and improvements may be made to the embodiments hereinbefore described without departing from the scope of the invention.

The invention claimed is:

1. A length of load bearing flexible conduit for use in a body of water and adapted for deployment from a reel located on a water going vessel into the body of water, the load bearing flexible conduit comprising an inner layer having a throughbore for carrying fluids and a load bearing outer layer and a further outer protective covering;
   wherein the load bearing flexible conduit is flexible such that it is capable of being stored, prior to use, on a reel and is further capable of being at least partially payed out from the reel into the body of water during use;
   wherein the the inner layer is leak proof;
   wherein the load bearing flexible conduit further comprises a termination at each end, wherein each termination comprises a load transfer mechanism to transfer load from the termination to the load bearing outer layer of the length of the load bearing flexible conduit wherein the load transfer mechanism comprises:
      an insert; and
      a generally cylindrical ferrule member secured to the respective end of the respective length of load bearing flexible conduit and to the insert by being crimped thereto
      wherein the respective load bearing outer layer of the respective length of load bearing flexible conduit is located over the ferrule member;
      a generally cylindrical body member having an enlarged diameter portion,
      wherein the enlarged diameter portion further comprises an angled inner surface against which is located an angled member in the form of a wedge-shaped member; and
      a cap member secured to the generally cylindrical body member,
      wherein said cap member comprises an inwardly projecting shoulder which abuts against an outer end of the ferrule member and thereby transmits axially directed force between the ferrule member and the cap member, and
      wherein an outermost end of the load bearing outer layer is embedded in the wedge-shaped member between the ferrule member and the angled inner surface and is further secured between the angled inner surface and the cap member such that the load is capable of being transferred from the termination to the ferrule member to the cap member to the generally cylindrical body member to the wedge-shaped member to the load bearing outer layer.

2. A length of load bearing flexible conduit according to claim 1, wherein the termination also comprises a connection mechanism to connect the termination and thereby the load bearing flexible conduit to a connection mechanism on a joint adapted to couple two lengths of load bearing flexible conduit together via adjoining ends of the said two lengths such that the throughbore of the joint is in sealed fluid communication with the throughbore of the respective length of load bearing flexible conduit.

3. A length of load bearing flexible conduit according to claim 1, wherein the load transfer mechanism also includes a generally cylindrical body member having an enlarged diameter portion wherein the enlarged diameter portion comprises an angled inner surface against which can be located an angled member.

4. A length of load bearing flexible conduit according to claim 3, wherein the angled member is formed from a potting compound.

5. A length of load bearing flexible conduit according to claim 3, wherein the load transfer mechanism further comprises embedding at least a portion of the load bearing member in the angled member between the ferrule member and the angled inner surface.

6. A length of load bearing flexible conduit according to claim 5, wherein the load transfer mechanism further comprises a cap member wherein the outermost end of the load bearing outer layer is secured between one end of the said angled member and the cap member such that load is capable of being transferred from the termination to the ferrule member to the cap member to the body member to the angled member and to the load bearing outer layer(s).

7. A length of load bearing flexible conduit according to claim 6, wherein the load bearing flexible conduit is incorporated in a system which is suitable for delivering fluids between a vessel on the surface of the sea to a subsea structure located below the sea such as on the seabed in relatively close proximity to a hydrocarbon well.

8. A length of load bearing flexible conduit according to claim 1, wherein the load bearing outer layer comprises an arrangement of aramid fibres and wherein the arrangement of aramid fibres comprises a braided arrangement of fibres formed in a layer along the longitudinal length of the load bearing flexible conduit on an outer surface of the inner layer(s).

9. A length of load bearing flexible conduit according to claim 8, wherein the braided arrangement of fibres are formed in a criss-cross arrangement where a number of the fibres are wound in a first helical arrangement around the outer surface of the inner layer in one direction and a number of fibres are wound in a second helical arrangement in the other direction such that each helically arranged fibre crosses each of the other oppositely directed fibres by passing over or under the oppositely arranged fibres in a repeating manner.

10. A length of load bearing flexible conduit according to claim 1, wherein the load bearing outer layer(s) is covered along most of its longitudinal length but not including the ends thereof by having an outer sheath extruded over itself, where the outer sheath provides a protective covering to the load bearing layer(s); and wherein the outer protective covering does not cover the ends of the load bearing outer layer.

* * * * *